(12) United States Patent
Scherl et al.

(10) Patent No.: US 11,809,167 B2
(45) Date of Patent: Nov. 7, 2023

(54) CONTAINER PROCESSING SYSTEM

(71) Applicant: Krones AG, Neutraubling (DE)

(72) Inventors: Stefan Scherl, Bernhardswald (DE); August Peutl, Woerth/Donau (DE); Heinrich Bielmeier, Pilsting-Grosskoellnbach (DE); Florian Lauterbach, Illkofen (DE); Roland Laumer, Regensburg (DE); Stefan Elsperger, Soechtenau (DE); Michael Neubauer, Grassau (DE); Alexander Kaiser, Aholfing (DE); Wolfgang Roidl, Deuerling (DE); Frank Winzinger, Regensburg (DE)

(73) Assignee: Krones AG, Neutraubling (DE)

( * ) Notice: Subject to any disclaimer, the term of this patent is extended or adjusted under 35 U.S.C. 154(b) by 9 days.

(21) Appl. No.: 17/386,290

(22) Filed: Jul. 27, 2021

(65) Prior Publication Data
US 2022/0035345 A1 Feb. 3, 2022

(30) Foreign Application Priority Data
Jul. 31, 2020 (DE) .......................... 102020120279.2

(51) Int. Cl.
G05B 19/416 (2006.01)
(52) U.S. Cl.
CPC .................. *G05B 19/4166* (2013.01); *G05B 2219/45048* (2013.01)
(58) Field of Classification Search
None
See application file for complete search history.

(56) References Cited

U.S. PATENT DOCUMENTS

| 7,131,468 B2 | 11/2006 | Schuman et al. |
| 9,463,591 B2 | 10/2016 | Winzinger |
| 9,791,468 B2 | 10/2017 | Riether et al. |

(Continued)

FOREIGN PATENT DOCUMENTS

| CN | 102556440 A | 7/2012 |
| CN | 104097816 A | 10/2014 |

(Continued)

OTHER PUBLICATIONS

Extended European Search Report dated Jan. 7, for counterpart European App. No. EP 21187911.

(Continued)

*Primary Examiner* — Carlos R Ortiz Rodriguez
(74) *Attorney, Agent, or Firm* — Caesar Rivise, PC

(57) ABSTRACT

The invention relates to a container processing system (10A-10U) for processing containers (12). The container processing system (10A-10U) has a plurality of processing units (22) for processing the containers (12) and a planar drive system (14) for transporting the containers (12). The planar drive system (14) is configured to move the plurality of movement devices (18) individually to a selection of the plurality of processing units (22) according to in each case one of a plurality of processing profiles for different container processing, wherein each of the plurality of processing profiles has a different selection of the plurality of processing units (22). The container processing system (10A-10U) advantageously allows flexible processing of different containers (different formats, contents, designs, bundles, packages, etc.) from a lot size of 1.

17 Claims, 14 Drawing Sheets

(56) References Cited

U.S. PATENT DOCUMENTS

| | | |
|---|---|---|
| 9,810,706 B2 | 11/2017 | Riether et al. |
| 9,969,570 B2 | 5/2018 | Heise et al. |
| 10,126,317 B2 | 11/2018 | Heise et al. |
| 10,175,259 B2 | 1/2019 | Riether |
| 10,273,095 B2 | 4/2019 | Ragan |
| 10,662,000 B2 | 5/2020 | Grazioli et al. |
| 10,669,049 B2 | 6/2020 | Eberhardt et al. |
| 2014/0305546 A1 | 10/2014 | Bergers et al. |
| 2017/0360068 A1 | 12/2017 | Concin et al. |

FOREIGN PATENT DOCUMENTS

| | | |
|---|---|---|
| CN | 107427039 A | 12/2017 |
| CN | 108454065 A | 8/2018 |
| CN | 109911557 A | 6/2019 |
| CN | 109911557 A | 6/2019 |
| DE | 102010028769 A1 | 11/2011 |
| DE | 102010028769 A1 | 11/2011 |
| DE | 102014214697 A1 | 1/2016 |
| DE | 102014214697 A1 | 1/2016 |
| DE | 102015100444 A1 | 7/2016 |
| DE | 102015209618 A1 | 12/2016 |
| DE | 102015209618 A1 | 12/2016 |
| DE | 202015106723 U1 | 3/2017 |
| DE | 202015106723 U1 | 4/2017 |
| DE | 102016222497 A1 | 5/2018 |
| DE | 102017222425 A1 | 6/2019 |
| DE | 102018203667 A1 | 9/2019 |
| EP | 2511205 A2 | 10/2012 |
| EP | 2927163 A1 | 10/2015 |
| EP | 2927163 B1 | 2/2018 |
| EP | 3656707 A1 | 5/2020 |
| WO | 2013098202 A1 | 7/2013 |
| WO | 2016012171 A1 | 1/2016 |
| WO | 2018049104 A1 | 3/2018 |
| WO | 2019048249 A1 | 3/2019 |
| WO | WO 2019048249 A1 | 3/2019 |
| WO | 2021001863 A1 | 1/2021 |

OTHER PUBLICATIONS

English-language abstract of CN 109911557A.
English abstract for CN 102556440 A (2012).
English abstract for DE 102016222497 A1 (2018).
English abstract for DE 202015106723 U1 (2017).

CONTAINER PROCESSING SYSTEM

CROSS-REFERENCE TO RELATED APPLICATIONS

This application claims priority to DE 102020120279.2, filed Jul. 31, 2020, the contents of which are incorporated herein by reference in its entirety for all purposes.

TECHNICAL FIELD

The invention relates to a container processing system having a plurality of processing units for processing containers.

TECHNICAL BACKGROUND

In filling and packaging systems, containers are transported through the individual system parts on permanently defined transport tracks, in the process being filled, closed, labelled, inspected and segregated out, grouped and packaged, this being performed at an output rate set on the basis of process times. The transport paths between the system parts can additionally serve as buffers for a quantity of containers in order to avoid a standstill of the entire system for a brief period when a system part is at a standstill, due to a fault for example.

It is not possible to produce different products simultaneously on a single line. More or less complex changeover or conversion processes are required to enable a different product to be produced. The products that are produced on a system can differ in terms of container type and format, content and added features (label or printing). Large batch sizes are therefore chosen, and this in turn requires a downstream store. Picking of mixed bundles or mixed pallets can be carried out afterwards.

One disadvantage of this known prior art is the "rigid" production of one product with a set or prepared container format. Production from a lot size of 1 is not practical or is uneconomical. The buffer sections between the system parts require a lot of space. Starting and emptying the system takes a relatively long time, particularly on account of the long transport and buffer sections. Conversion to another product leads to a standstill of the system. Downstream picking involves an additional effort. Moreover, the creation of mixed bundles is partly done manually by operators.

WO 2018/049104 A1 discloses a system and a method for simultaneously filling containers of different shapes and sizes. A multiplicity of vehicles can be routed along a rail system to facilitate the simultaneous delivery of first containers and second containers to various unit operating stations. The first and second containers differ from one another in their external shape and internal volume.

DE 10 2014 214 697 A1 discloses a device for filling a container. The device has a planar drive. In one exemplary embodiment, a plurality of filling needles of a prefilling station can be provided, under which movers bring the containers to be prefilled. For this purpose, the filling needles are arranged in a row parallel to the direction of movement. A plurality of prefilling points can be provided. The mover can be controlled in such a way that it moves to a free prefilling point. For this purpose, a corresponding sensor system must be provided for evaluating the current mover positions, said sensor system detecting the presence of a mover at a prefilling point and activating the respective drive surfaces by means of a higher-level control system in such a way that the mover does not move to an occupied prefilling point.

It is the underlying object of the invention to provide an alternative and/or improved container processing system.

SUMMARY OF THE INVENTION

The object is achieved by means of the features of independent Claim 1. Advantageous developments are specified in the dependent claims and the description.

One aspect relates to a container processing system for processing (e.g. producing, cleaning, testing, filling, closing, labelling, printing and/or packaging) containers (e.g. for liquid media, preferably beverages or liquid foodstuffs). The container processing system has a plurality of processing units for processing the containers. The container processing system has a planar drive system having a base element and a plurality of movement devices for transporting the containers. The base element connects the plurality of processing units to one another. The plurality of movement devices can be moved independently of one another relative to the base element, preferably by means of magnetic interaction between the base element and the plurality of movement devices. The planar drive system is configured (e.g. by means of a control unit) to move the plurality of movement devices individually to a selection of the plurality of processing units according to in each case one of a plurality of processing profiles for different container processing, wherein each of the plurality of processing profiles has a different selection of the plurality of processing units.

The container processing system advantageously allows flexible processing of different containers (different formats, contents, designs, bundles, packages, etc.) from a lot size of 1. The movement devices can move the respectively held containers in a flexible manner to one or more desired processing units. By means of fixed processing units, large rotating masses (e.g. filler carousel) can be eliminated, if desired. Transfers (into the "rotating part") can be eliminated along the entire container transport path. Without rigid connections to increase performance or add flexibility for new products, the container processing system is highly flexible, and can also be subsequently expanded by the customer. It is possible to implement a time buffer by parking the container in order to keep the number of movement devices low. Containers can also be segregated out if malfunctions occur. The container processing system is compact and has a space-saving construction. A wide variety of processes can be combined with one another in the smallest of spaces. No space-consuming buffer sections are required. In addition, an increase in performance can be achieved, for example, by parallelization (e.g. arrangement of a plurality of identical processing units) and a "chaotic" approach to the same processing units, i.e. the one which is currently free. The duration of the longest process no longer determines the entire process. System availability can be improved. In the event of a malfunction or maintenance on one processing unit, another, identical processing unit can be approached, if present, and production can be continued at a reduced rate if appropriate. At the same time, the faulty processing unit can be repaired or serviced.

The movement devices preferably each have a container holder (e.g. a suction gripper, a mechanical gripper or a clamping holder) for holding at least one container.

In one exemplary embodiment, each of the selection of the plurality of processing profiles has at least two different processing units of the plurality of processing units; and/or each of the plurality of processing profiles has a sequence (for approach) of the selected processing units.

In a further exemplary embodiment, the plurality of processing units has a plurality of testing units, preferably of different designs, for testing the containers; a plurality of rinsing units, preferably of different designs, for rinsing the containers; a plurality of filling units, preferably of different designs and/or supplied with different filling media, for filling the containers; a plurality of labelling units, preferably of different designs and/or loaded with different labels, for labelling the containers; a plurality of printing units, preferably of different designs, for printing on the containers; a plurality of closing units, preferably of different designs and/or loaded with different closures, for closing the containers; a plurality of grouping units, preferably of different designs, for grouping the containers; a plurality of packaging units, preferably of different designs and/or loaded with different packagings, for packaging the containers; and/or a plurality of container production units or container conditioning units, preferably of different designs, for producing or conditioning (e.g. heating or cooling) the containers.

For example, the different selection of processing profiles can lead to the possibility of processing containers of different sizes and/or different shapes. As an alternative or in addition, the containers can be capable of being produced, conditioned, filled, tested, labelled, printed on, grouped, closed and/or packed in different ways.

As a preferred option, the selection of a first processing profile can include a first processing unit of the plurality of processing units, and the selection of a second processing profile can include a second processing unit of the plurality of processing units, wherein the first processing unit is embodied in a different way from the second processing unit. As an option, the selection of the first processing profile can include a third processing unit of the plurality of processing units, and the selection of the second processing profile can include the third and/or a fourth processing unit of the plurality of processing units. The third and fourth processing units can be embodied in different ways.

Preferably, the selection of a first processing profile can include a first filling unit, which provides a first filling medium for filling the containers, and the selection of a second processing profile can have a second filling unit, which provides a second filling medium for filling the containers, wherein the second filling medium is different from the first filling medium.

It is possible that the processing profiles are stored in a control unit of the planar drive system and can be called up to operate the movement devices. For example, the processing profiles can be freely applied by a user.

In a further exemplary embodiment, the planar drive system is arranged as a line interface with the plurality of processing units, preferably with the base element in a (for example rectilinear) strip form (e.g. with processing units arranged on one side or on both sides with respect to the two longitudinal sides of the strip form).

For example, at least some of the plurality of processing units can have a conveyor unit connected to the planar drive system in order to receive containers from the plurality of movement devices. As an alternative or in addition, at least some of the plurality of processing units can be arranged to process a container while the container is being held by a respective movement device.

In one embodiment, the plurality of processing units comprises a rinsing unit for rinsing containers, and the plurality of movement devices can be moved upside down on the base element (e.g. on an underside of the base element) in a section downstream of the rinsing unit in order to empty the containers.

In a further embodiment, the base element is oriented horizontally. As a preferred option, at least some of the plurality of processing units (at least some embodied as filling units, for example) are arranged, preferably suspended, directly above the base element in a plurality of rows and a plurality of columns, preferably in a chequerboard pattern. This can allow a very compact construction.

In a further embodiment, the container processing system furthermore has at least one further planar drive system having a further base element and a plurality of further movement devices, which transport the plurality of processing units. The plurality of further movement devices can be moved independently of one another relative to the further base element, preferably by means of magnetic interaction between the further base element and the plurality of further movement devices. Thus, the processing units can also be moved in a flexible manner.

In a development, the containers can be moved jointly by means of the plurality of movement devices, and the plurality of processing units can be moved jointly by means of the plurality of further movement devices, during the respective container processing operation.

In a development, the base element and the further base element are oriented in a manner inclined relative to, preferably perpendicular to, one another, wherein the base element is preferably oriented horizontally.

In one variant embodiment, the base element has a plurality of vertically spaced planes. At least some of the plurality of processing units are preferably arranged on or at different planes of the plurality of vertically spaced planes. The container processing system preferably furthermore has at least one elevator unit for the plurality of movement devices, wherein the at least one elevator unit connects the plurality of vertically spaced planes of the base element to one another. This makes it possible to create a three-dimensional movement space for the movement devices. This makes possible a very compact design with a small system footprint.

For example, the elevator unit can be embodied as a movable section of the base element or as a unit separate from the base element.

In one exemplary embodiment, the container processing system furthermore has a plurality of removal systems (e.g. removal conveyors), which are connected to the planar drive system at different positions. The plurality of processing units has a plurality of testing units of different designs for testing different features of the containers. The planar drive system is configured (e.g. by means of a control unit), depending on a fault determined by means of one of the plurality of testing units, to move the respective container subject to the fault by means of one of the movement devices to a removal system of the plurality of removal systems which is associated with the detected fault. Classified removal of defective containers can thus take place in a simple manner.

In a further exemplary embodiment, each of the plurality of movement devices has a support surface for the containers, which is formed by a plurality of (e.g. parallel-spaced) webs.

In a development, the container processing system furthermore has an infeed conveyor with a comb-shaped outlet region. The planar drive system is configured (e.g. by means of a control unit) so that, for container takeover, the plurality of movement devices performs a stroke motion (e.g.

upwards) relative to the base element at the comb-shaped outlet region, with the result that the plurality of webs passes through the comb-shaped outlet region. As an alternative or in addition, the container processing system furthermore has an outfeed conveyor having a comb-shaped inlet region. The planar drive system is configured (e.g. by means of a control unit) so that, for container transfer, the plurality of movement devices performs a stroke motion (e.g. downwards) relative to the base element at the comb-shaped inlet region, with the result that the plurality of webs emerges from the comb-shaped inlet region.

In one embodiment, the container processing system furthermore has an infeed conveyor with an outlet region having a beveled underside. The planar drive system is configured (e.g. by means of a control unit), for container takeover, to move the plurality of container movement devices along the beveled underside of the outlet region in an inclined manner and by means of a stroke motion (e.g. upwards) relative to the base element and to emerge directly downstream of the outlet region for container takeover from the outlet region.

In a further embodiment, the container processing system furthermore has an infeed conveyor with an outlet region and a cross-transfer unit (e.g. guide rails, conveyor belt, etc.), which extends transversely over the outlet region. The planar drive system is preferably configured (e.g. by means of a control unit), for container takeover, to move the plurality of movement devices laterally next to the outlet region and to receive the containers pushed down from the outlet region by means of the cross-transfer unit. As an alternative and/or in addition, the container processing system furthermore has an outfeed conveyor having an inlet region and a cross-transfer unit (e.g. guide rails, conveyor belt, etc.) which extends over the base element and laterally with respect to the inlet region. The planar drive system is preferably configured (e.g. by means of a control unit), for container transfer, to move the plurality of movement devices laterally next to the inlet region and to transfer the containers to the inlet region by means of the cross-transfer unit.

In a variant embodiment, the planar drive system is configured (e.g. by means of a control unit) to synchronize the plurality of movement devices with a speed of the containers to be taken over on the outlet region during container takeover. This enables continuous container transfer without breaking the containers. Thus, the risk of the containers spilling over or tipping over can be significantly reduced and throughput can be increased.

In a further variant embodiment, the planar drive system is configured (e.g. by means of a control unit) to incline the plurality of movement devices relative to the base element during acceleration (e.g. positive or negative) and/or cornering, preferably to an extent such as to prevent the transported containers from spilling over and/or tipping over.

In a further variant embodiment, the planar drive system is configured (e.g. by means of a control unit) to adapt a movement path of the plurality of movement devices in such a way that transverse acceleration on the transported containers is reduced to below a predetermined limit value, preferably to prevent the transported containers from spilling over and/or tipping over.

In a further variant embodiment, the planar drive system is configured (e.g. by means of a control unit) to adapt a spacing of the transported containers to a spacing of a target processing unit of the plurality of processing units by means of the movement devices.

In a further exemplary embodiment, each of the plurality of movement devices has a support surface for the containers which is formed by a plurality of (for example, parallel) webs, and optionally has a container holder (e.g. an active or passive container neck clamp), preferably a container neck holder. The containers can preferably be clamped between the support surface and the container holder of the respective movement device (e.g. between container bottom and container neck ring).

In a further exemplary embodiment, at least one processing unit has a plurality of processing stations, each of which has a support surface, formed by a plurality of (for example, parallel) webs, for the containers. As a preferred option, the planar drive system can be configured (e.g. by means of a control unit) so that, for container takeover and/or container transfer, the plurality of movement devices performs a stroke motion and/or a tilting movement relative to the base element at the support surface of the respective processing station, with the result that the support surface of the respective movement device passes through the support surface of the respective processing station, and/or the support surface of the respective movement device and the support surface of the respective processing station mesh with one another. In other words, the support surfaces of a transport movement device and those of a processing station can overlap or engage in one another temporarily and partially or in some region or regions, preferably without touching one another. In this case, the two support surfaces are preferably arranged substantially in the same plane.

During the overlapping or meshing, at least one web of the support surface of the transport movement device is preferably arranged at least partially, or in some region or regions, in front of or behind a web of the support surface of the processing station, as seen in the transport direction. In other words, a web of one support surface can cover a web of the other support surface in the transport direction of the containers.

A web preferably has a width of less than two thirds, preferably less than half, even more preferably less than one third, of a diameter (of the support surface) of a container to be transported.

A web or the support surface and optionally the holder can be arranged on the transport movement device at least in some region or regions or in a partially projecting manner.

In particular, the web or the support surface can leave the base element of the planar drive system at least temporarily and in some region or regions or in part for container takeover or discharge. Leaving means that this or these is/are no longer arranged in the vertical direction above the base element, at least in some region or regions or in part.

Preferably, the term "control unit" can refer to an electronic unit (e.g. with microprocessor(s) and data memory) which can perform open-loop control tasks and/or closed-loop control tasks and/or processing tasks, depending on the design. Even if the term "control" is used herein, it can also usefully include or mean "closed-loop control" or "control with feedback" and/or "processing".

The preferred embodiments and features of the invention which are described above can be combined with one another as desired and are disclosed independently of one another, in particular independently of the presence of the processing profiles.

BRIEF DESCRIPTION OF THE FIGURES

Further details and advantages of the invention are described below with reference to the attached drawings. In the drawings.

The embodiments shown in the figures are at least partially identical, and therefore similar or identical parts are provided with the same reference signs, and reference is also made, for their explanation, to the description of the other embodiments or figures in order to avoid repetition.

DETAILED DESCRIPTION OF EXEMPLARY EMBODIMENTS

Figure 1:
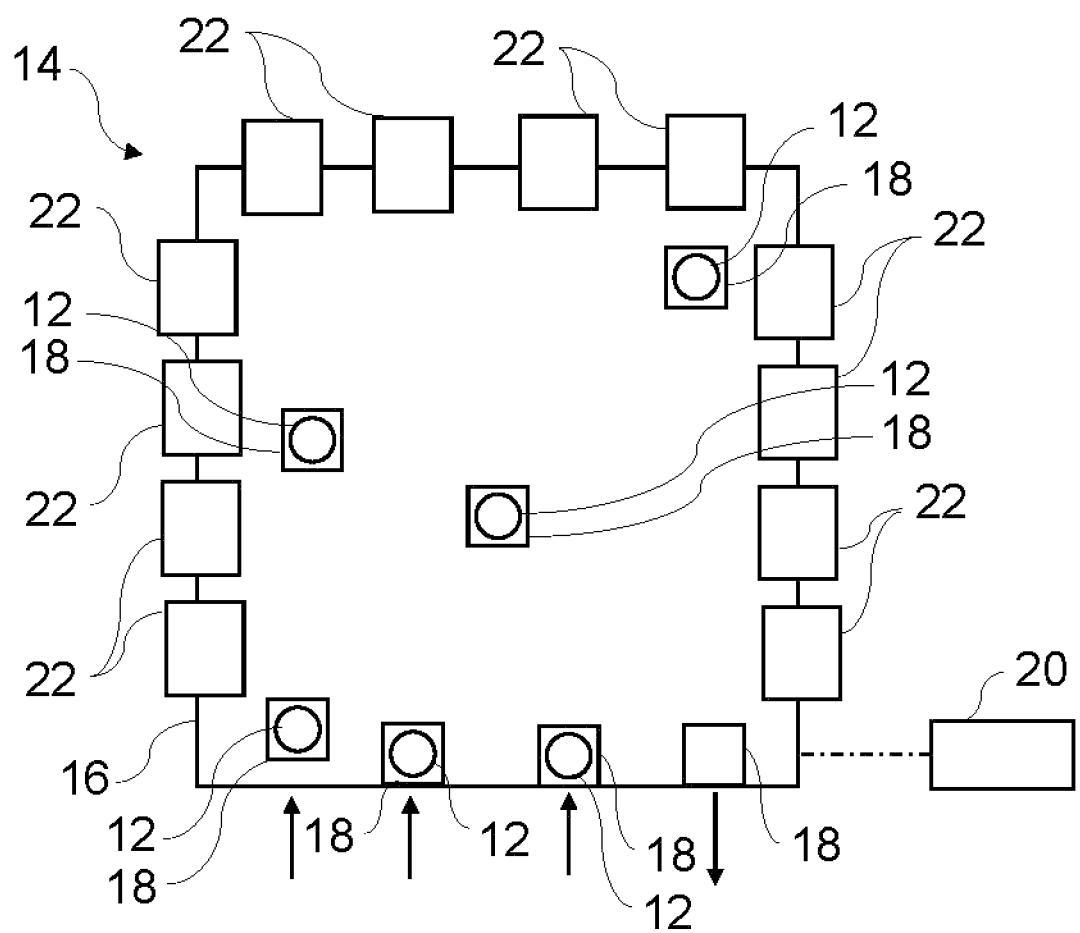
FIG. 1 shows a schematic plan view of a container processing system.

FIG. 1 shows a container processing system 10A for processing containers 12. The containers 12 can be embodied as bottles, cans, canisters, etc., for example. The containers 12 can have, for example, a round (e.g. circular or elliptical) or angular basic shape. The containers 12 are preferably used to hold liquid, pasty or solid foodstuffs.

The container processing system 10A has a planar drive system 14. The planar drive system 14 is preferably a magnetic planar drive system.

The planar drive system 14 has a base element 16, a plurality of movement devices 18 (movers or runners) and a control unit 20 (shown separately only in FIG. 1). The movement devices 18 can be moved freely and independently of one another over the base element 16 by means of magnetic interaction with the base element 16. The control unit 20 is designed to control a movement of the movement devices 18 with respect to the base element 16. Even if this is not explicitly mentioned or explained below, all the planar drive systems 14 described herein have a corresponding control unit 20.

The movement devices 18 can also be rotated relative to the base element 16 (e.g. swiveling) by means of magnetic interaction with the base element 16. The movement devices 18 can also be inclined with respect to the base element 16 (e.g. pitching and/or rolling) by means of magnetic interaction with the base element 16. The movement devices 18 can likewise perform a stroke motion upwards or downwards relative to the base element 16 by means of magnetic interaction with the base element 16. A number of the movement devices 18 can be freely selectable, depending on the application.

The base element 16 forms a stator of the planar drive system 14. The movement devices 18 form runners of the planar drive system 14. The movement devices 18 are supported in a contactless manner by the base element 16, preferably on an upper side of the base element 16. The base element 16 can have, for example, a plurality of electromagnets arranged in a distributed manner, e.g. electric coils. The movement devices 18 can have permanent magnets. The electromagnets are preferably arranged in a matrix which extends in a plane of the base element 16 (here preferably a horizontal plane). The control unit 20 of the planar drive system 14 can control a power supply to the electromagnets of the base element 16 to build up electromagnetic fields with a desired field strength at a desired position of the base element 16. Forward propulsion, rotation, inclination and/or a stroke of the movement devices 18 can be brought about by corresponding electromagnetic fields of the electromagnets of the base element 16. The base element 16 is preferably oriented in a horizontal plane. However, other orientations are also conceivable, e.g. an orientation inclined with respect to the horizontal plane, preferably a vertical orientation.

The base element 16 can have different designs and shapes, e.g. strip-shaped, rectangular, square, polygonal, round, circular, etc. The base element 16 can be arranged in a plane, preferably a horizontal plane. However, it is also possible for the base element 16 to be arranged in a plurality of planes (cf. the exemplary embodiment of FIG. 2). For clean room applications, the base element 16 can be arranged within a clean room or can form a boundary wall of the clean room, e.g. a lower boundary wall. For clean room applications, it is moreover possible, in the case of the planar drive system 14, to dispense with sealing towards the clean room, e.g. in the form of water locks in conventional applications, as in the case of mechanical transport systems.

The movement devices 18 are designed to move the containers 12 as the respective movement device 18 moves relative to the base element 16. For this purpose, the movement devices 18 can, for example, each have a container holder, by means of which at least one container 12 can be held. The container holder can be embodied, for example, as a suction gripper, a mechanical gripper, a clamping holder, etc. It is possible for a plurality of movement devices 18 to cooperate to transport a container 12. It is also possible for one movement device 18 to transport a plurality of containers 12, e.g. in the form of a bundle, at the same time.

The containers 12 can be transported by one or more infeed conveyors (belt conveyors, for example) to the base element 16 or the movement devices 18. It is possible that one or more discharge conveyors (belt conveyors, for example) are arranged to take over and transport away the processed containers 12 from the movement devices 18. Exemplary variants for container transfer and container takeover are described herein with reference to FIGS. 13A to 15B, for example.

The container processing system 10A has a plurality of processing units 22. For example, the processing units 22 can be arranged close to or adjacent to the base element 16, enabling them to be reached by the movement devices 18 with the transported containers 12. The processing units 22 can be arranged in a fixed manner, e.g. at the edge of or else within the base element 16. It is also possible for the processing units 22 to be supported by their own movement devices and to be movable with respect to the base element 16 (not illustrated in FIG. 1). The processing units 22 can process a respective container 12 while the container 12 is being supported by a respective movement device 18. The processing units 22 can be of different designs, at least in some cases.

The processing units 22 can have, for example, at least one testing unit or inspection unit for testing/inspecting the containers 12, e.g. for damage and/or contamination. The testing units can have optical sensors (e.g. camera, laser scanner, LED scanner), for example. In the case of a plurality of testing units, these can preferably be of different designs, at least in some cases.

Alternatively or in addition, the processing units 22 can have, for example, at least one rinsing unit for rinsing or cleaning the containers 12, e.g. with water or aseptic fluid.

Alternatively or in addition, the processing units 22 can have, for example, at least one filling unit for filling the containers 12, e.g. with liquid or pasty foodstuffs. In the case of a plurality of filling units, these can preferably be of different designs, at least in some cases, and/or can be supplied with different filling media. Different filling units for different flavorings and/or filling products, e.g. also with pieces of fruit, can be included, for example. It is also possible for filling to take place after the respective container 12 has been closed, e.g. by means of what is known as an Impresseal technique, in which filling is injected into the container 12 through the closure of the container 12, which is then welded.

As an alternative or in addition, the processing units 22 can have at least one labelling unit for labelling the containers 12. In the case of a plurality of labelling units, these can preferably be of different designs and/or can be loaded with different labels, at least in some cases.

As an alternative or in addition, the processing units 22 can have at least one printing unit for printing on the containers 12. In the case of a plurality of printing units, these can preferably be of different designs, at least in some cases.

As an alternative or in addition, the processing units 22 can have at least one closing unit for closing the containers 12. In the case of a plurality of closing units, these can preferably be of different designs and/or can be loaded with different closures, at least in some cases.

As an alternative or in addition, the processing units 22 can have at least one grouping unit for grouping the containers 12. In the case of a plurality of grouping units, these can preferably be of different designs, at least in some cases.

As an alternative or in addition, the processing units 22 can have at least one packaging unit for packing the containers 12. In the case of a plurality of packaging units, these can preferably be of different designs and/or can be loaded with different packagings, at least in some cases.

Alternatively or in addition, the processing units 22 can have at least one container production unit or container conditioning unit for producing or conditioning the containers 12, for example PET blow-molding machines, container heaters, etc. In the case of a plurality of container production units or container conditioning units, at least some of the designs can be different.

The processing units 22 can be arranged in groups. For example, the plurality of labelling units can be arranged on an outer side (left-hand outer side in FIG. 1, for example) of the base element 16. The plurality of filling units can be arranged on another outer side (the upper outer side in FIG. 1, for example) of the base element 16. The plurality of closing units can be arranged on another outer side (the right-hand outer side in FIG. 1, for example) of the base element 16.

A special feature of the container processing system 10A is that it can be used flexibly for processing different containers (different formats, contents, designs, bundles, packagings, etc.) from a lot size of 1. The movement devices 18 can move the respectively held containers 12 in a flexible manner to one or more desired processing units 22. This special feature can likewise be exploited by all the other container processing systems described herein.

For example, a first movement device 18 can move a first container 12 to a first filling unit for filling with a first filling medium, to a first labelling unit for labelling with a first label or to a first printing unit for printing with a first imprint, and to a first closing unit for closing with a first closure. A second movement device 18 can move a second container 12 to a second filling unit for filling with a filling medium, to a second labelling unit for labelling with a second label or to a second printing unit for printing with a second imprint, and to a second closing unit for closing with a second closure. The first filling medium may differ from the second filling medium. The first label may differ from the second label. The first imprint may differ from the second imprint. The first closure may differ from the second closure. It is also possible for the first movement device 18 and/or the second movement device 18 to move the container 12 to in each case more or fewer processing units 22.

Different processing profiles can be provided for different desired container processing operations. The processing profiles can be stored in the control unit 20 and can be adaptable. Each processing profile has a different selection from the plurality of processing units 22 to which the respective container 12 is to be moved by means of one of the movement devices 18. The respective selection can include only one or else a plurality of processing units 22. The processing profiles can, for example, each have the target coordinates of the selected processing units 22. The respective movement paths to the selected processing units 22 can be determined by the control unit 20 in real time, for example, or can likewise be included in the processing profiles.

An association of a container 12 with a processing profile can be accomplished, for example, by means of an RFID chip of the container 12, by means of a detectable code of the container 12 and/or by means of tracking of the container 12 on the container processing system 10A by means of sensors and/or control systems.

The figures below show exemplary embodiments of container processing systems which have planar drive systems that can be operated in accordance with the processing profiles mentioned. However, attention is drawn to the fact that the exemplary embodiments described with reference to the figures below are also disclosed independently of a planar drive configuration which uses different processing profiles.

Figure 2:
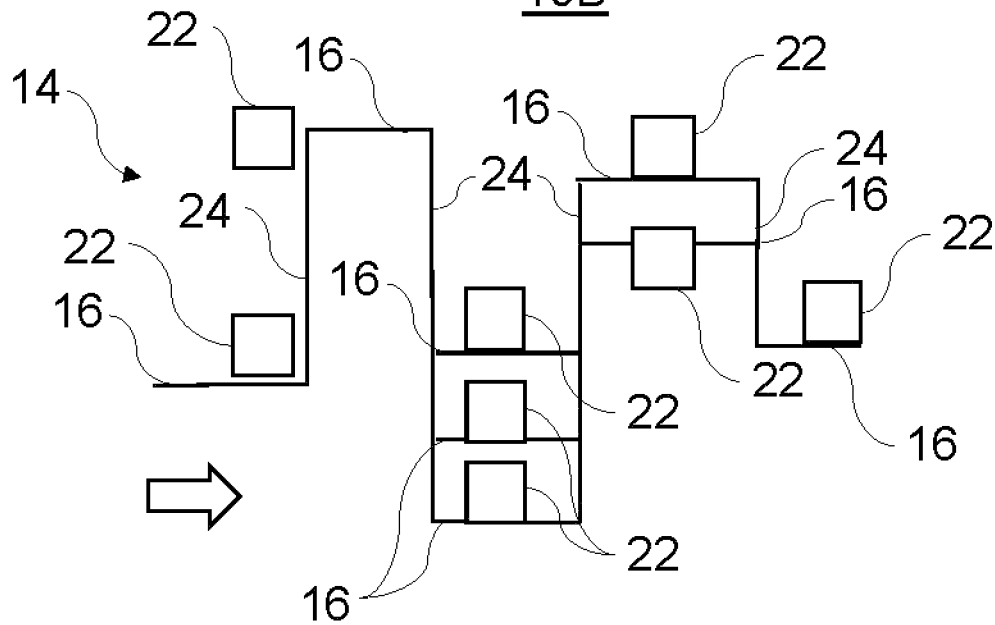
FIG. 2 shows a schematic side view of a container processing system.

FIG. 2 shows a container processing system 10B.

A special feature of container processing system 10B is the three-dimensional movement space. The base element 16 of the planar drive system 14 is arranged in a plurality of vertically spaced planes. Likewise, the processing units 22 can be arranged at different heights on a respective plane of the base element 16. Transfer of the movement devices 18 (not shown in FIG. 2) between the planes of the base element 16 can be accomplished with an elevator unit 24, for example. The elevator unit 24 can be provided separately from the base element 16, as illustrated. It is likewise possible for the elevator unit 24 to be formed by a vertically movable section of the base element 16. The elevator unit 24 can move the movement devices 18 to the different planes of the base element 16.

Figure 3:
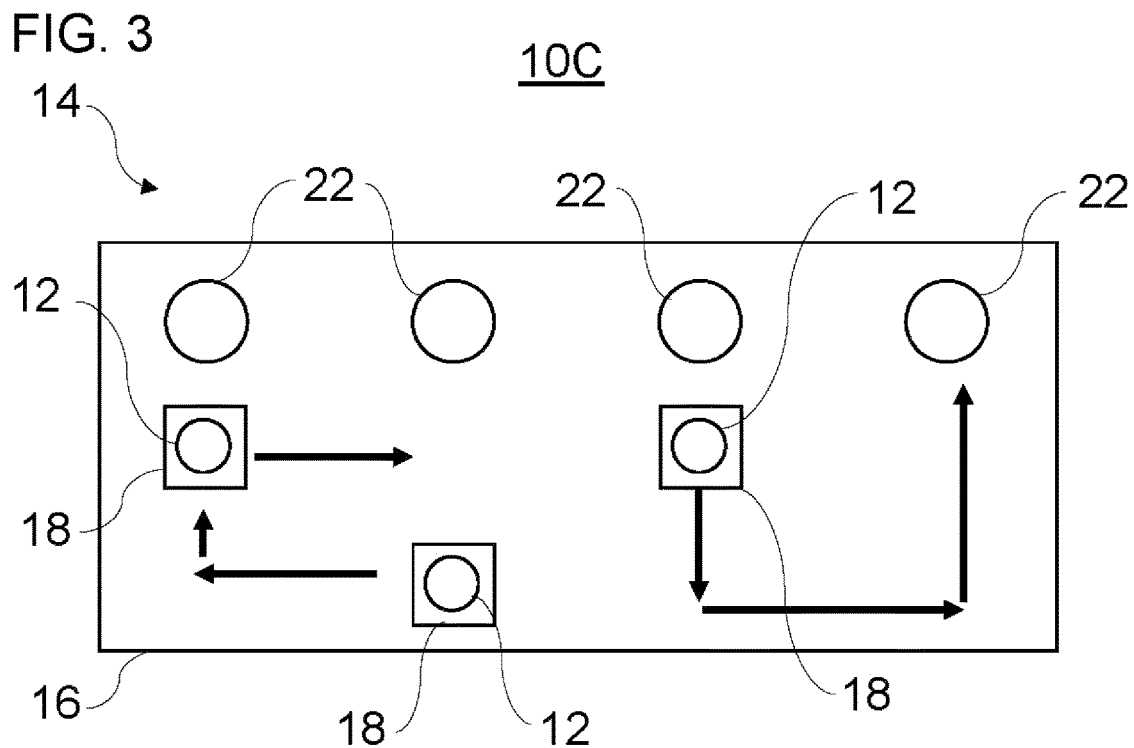
FIG. 3 shows a schematic plan view of a container processing system.

FIG. 3 shows a container processing system 10C.

Container processing system 10C has a plurality of processing units 22 embodied as filling units, for example. The movement devices 18 can each move the carried containers 12 to different filling units. The containers 12 can thus be filled differently. It is possible for the containers 12 to be moved one after the other to a plurality of filling units or to be moved only to one filling unit.

Figure 4:
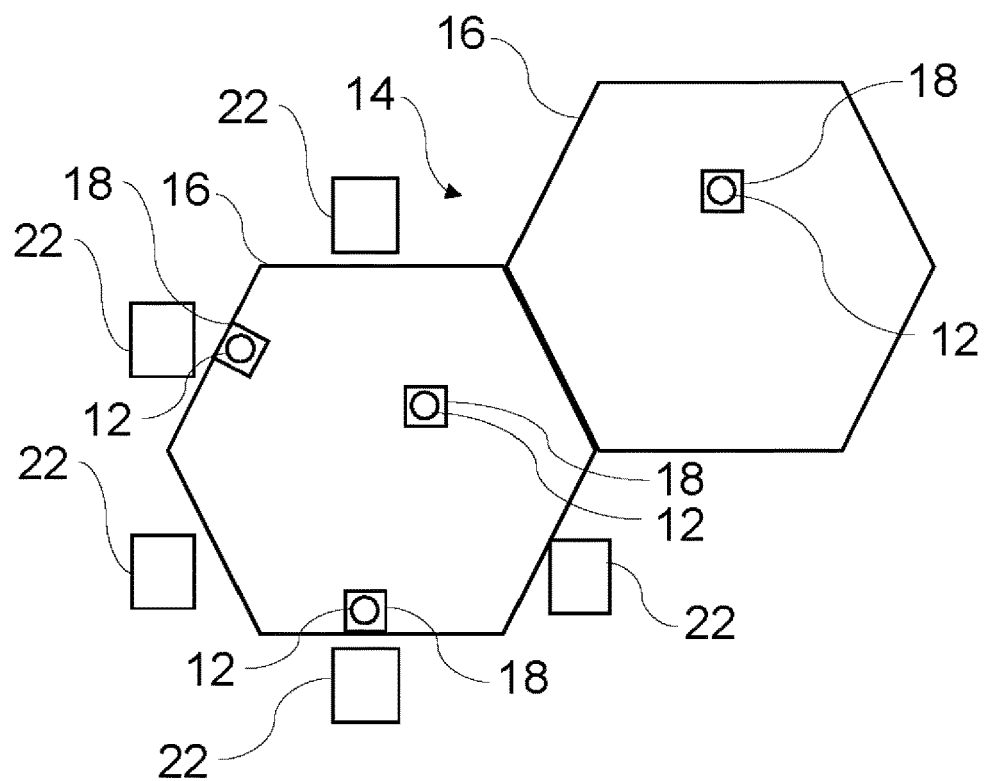
FIG. 4 shows a schematic plan view of a container processing system.

FIG. 4 shows a container processing system 10D.

Container processing system 10D has a planar drive system 14 with two base elements 16. The movement devices 18 can be moved on both base elements 16, for example, or separate movement devices 18 are provided for each of the base elements 16.

The two base elements 16 can be assigned to different system parts of container processing system 10D. One possibility, for example, is to arrange all the necessary processing units 22 which enable complete container processing, up to the product ready for sale, within one system part, i.e. in the region of one of the base elements 16. Another possibility is that only one processing step (testing, filling or fitting, for example) can be carried out per system part, i.e. per base element 16, in different variants on the different processing units 22 that can be reached by the respective base element 16. For the next processing step, the containers 12 are then moved to the next base element 16 by means of the movement devices 18.

Combinations of the two abovementioned embodiments are also possible, e.g. as an intercombination of different (incomplete) process steps in the sense of processing to give a product ready for sale.

Figure 5:
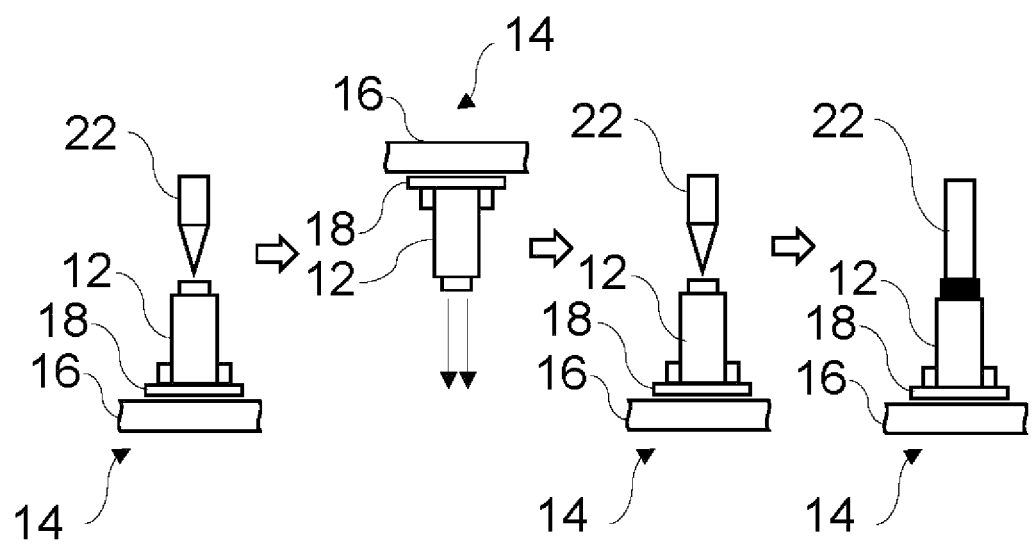
FIG. 5 shows a schematic side view of a plurality of successively executed process steps in a container processing system.

FIG. 5 shows different processing stations of a container processing system 10E, which can be approached in accordance with an exemplary processing profile.

First of all, the container 12, which is held on the movement device 18, is cleaned or rinsed out by means of a container processing unit 22 embodied as a rinsing unit. The rinsing liquid can be aseptic. Subsequently, the base element 16 runs (e.g. after a 180° turn or an elevator unit) in such a way that the movement device 18 can be positioned upside down. The rinsing liquid can flow out of the container 12, which is thus likewise held upside down. Subsequently, the base element 16 again runs in such a way that the movement device 18 and thus the container 12 can be positioned upright. The movement device 18 is moved to a container processing unit 22 embodied as a filling unit. The delivery unit fills the container 12. The movement device 18 can then move the container 12 to a container processing unit 22 embodied as a closing unit. The closing unit closes the container 12.

Figure 6:
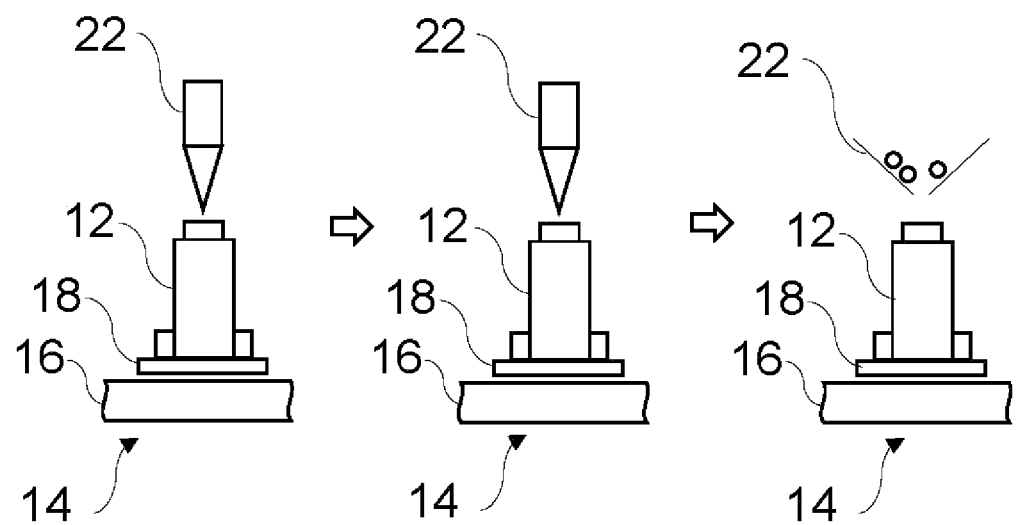
FIG. 6 shows a schematic side view of a plurality of successively executed process steps in a container processing system.

FIG. 6 shows different processing stations of a container processing system 10F, which can be approached in accordance with an exemplary processing profile.

First of all, the container 12, which is held on the movement device 18, is partially filled with a first flavoring by means of a container processing unit 22 embodied as a filling unit. Subsequently, the movement device 18 moves the container 12 to a further container processing unit embodied as a filling unit, which partially fills the container 12 with a second flavoring. Subsequently, the movement device 18 moves the container 12 to a further container processing unit embodied as a filling unit, which partially fills the container 12 with pieces of fruit.

Figure 7:
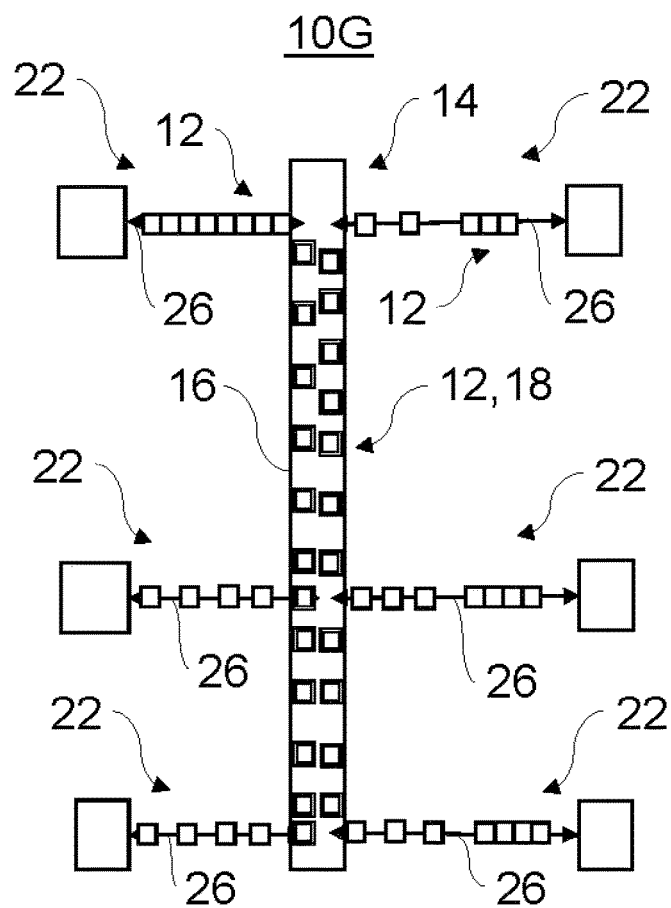
FIG. 7 shows a schematic plan view of a container processing system.

FIG. 7 shows a container processing system 10G.

In the case of container processing unit 10G, the planar drive system 14 is embodied as a flexible line interface. The line interface connects different container processing units 22 to one another. The planar drive system 14 can thus serve as a kind of sorting surface for the containers 12.

The container processing units 22 each have a container conveyor 26. The movement devices 18 can take over the containers 12 from one of the container conveyors 26 and, depending on the desired processing profile, can transfer them to another of the container conveyors 26. In order to hold the containers 12, the movement devices 18 can be positioned below or above or laterally with respect to the respective container 12, for example. The container conveyors 26 can be embodied as belt conveyors, for example. The container conveyors 26 convey the transferred containers 12 to a processing element of the respective processing unit 22 and/or to the base element 16 for transfer to the movement devices 18. After processing, the containers 12 can be moved back to the base element 16 or to a discharge conveyor (not illustrated in FIG. 7), for example.

Container processing system 10G can advantageously combine various functions in one system. Flexible distribution and optionally grouping of containers 12 into bundles is made possible. Containers 12 from different lines/machines/ system parts can be mixed with one another, or the corresponding lines/machines/system parts can be coupled with one another. Gaps in the flow of containers can be closed by a corresponding movement of the movement devices 18. Containers 12 or bundles can be buffered or removed by a corresponding movement of the movement devices 18. A speed of the flow of containers can be adapted by means of a corresponding movement of the movement devices 18. Moreover, no additional equipment parts are required for robot effectors or the like. Finally, sorting of empties in the case of lines for reusable containers can also be made possible.

Figure 8:
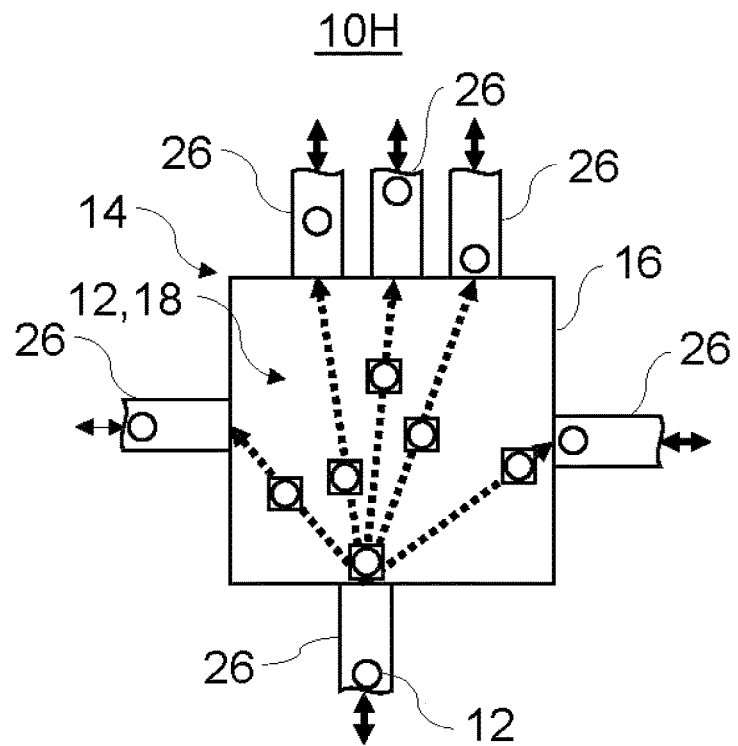
FIG. 8 shows a schematic plan view of a container processing system.

FIG. 8 shows a container processing system 10H.

Container processing system 10H is similar in design to container processing system 10G. In contrast to container processing system 10G, however, the base element 16 of container processing system 10H is not strip-shaped or linear, but rectangular.

Figure 9A:
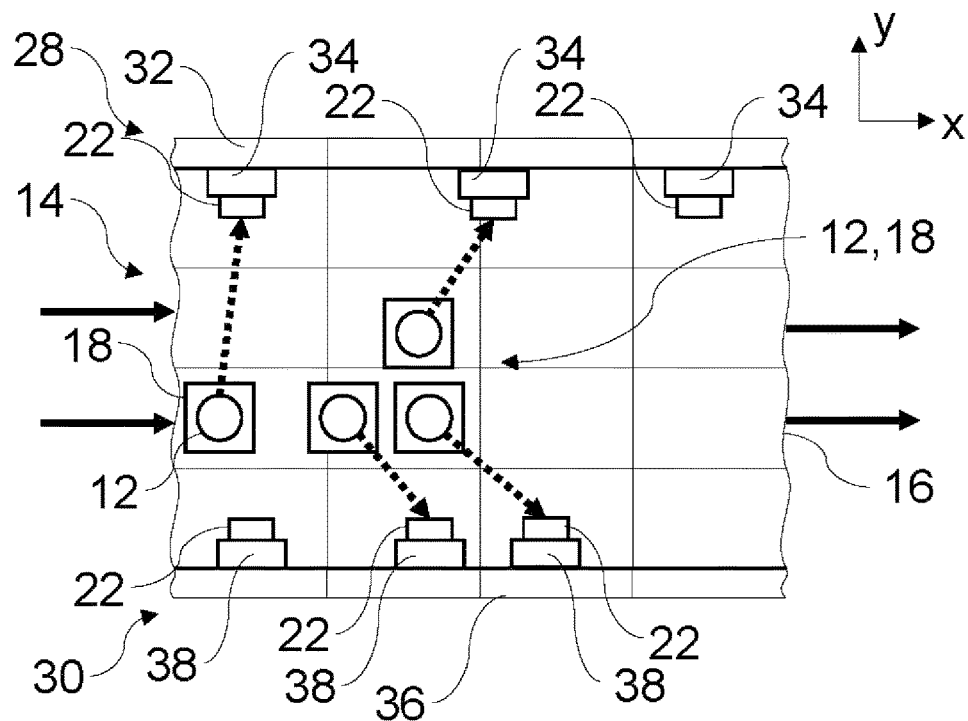
FIG. 9A shows a schematic plan view of a container processing system.
Figure 9B:
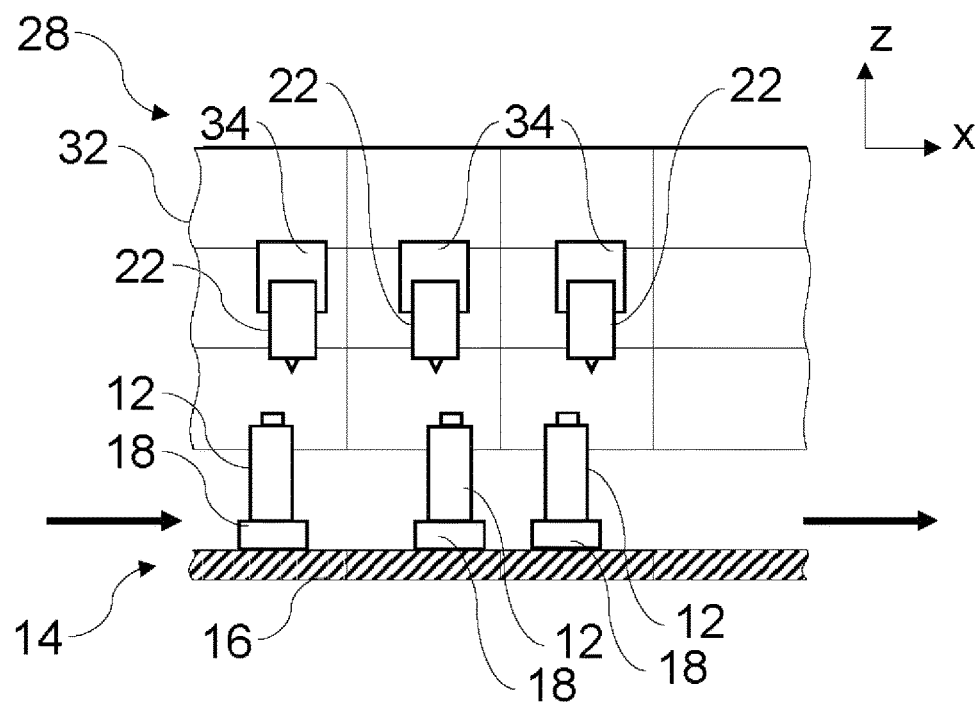
FIG. 9B shows a schematic sectional view through the container processing system of FIG. 9A.

FIGS. 9A and 9B show a container processing system 10I.

Container processing system 10I has a second planar drive system 28 and optionally a third planar drive system 30.

The second planar drive system 28 can have a base element 32 and a plurality of movement devices 34, each of which supports a processing unit 22. The base element 32 can be inclined, preferably perpendicularly, to the base element 16. However, it is also possible for the base elements 16 and 32 to be aligned parallel to and spaced apart vertically from one another. Base element 32 is arranged above base element 16. In other respects, the second planar drive system 28 can be embodied in substantially the same way as the planar drive system 14 that moves the containers 12.

The third planar drive system 30 can have a base element 36 and a plurality of movement devices 38, each of which supports a processing unit 22. Base element 36 can be inclined, preferably perpendicularly, to base element 16, and can be aligned parallel to base element 32. Base element 36 is arranged above base element 16. In other respects, the third planar drive system 30 can be embodied in substantially the same way as planar drive system 14.

By means of the (first) planar drive system 14, the held containers 12 can be moved in an x-y plane, for example. By means of the second planar drive system 28, the held processing units 22 can be moved in an x-z plane (shown in FIGS. 9A and 9B), for example, or in an x-y plane (not shown in FIGS. 9A and 9B), for example. By means of the third planar drive system 30, the held processing units 22 can be moved in an x-z plane.

During container processing, a respective processing unit 22 can move along with the processed container 12, namely by a mutually coordinated movement of the respective movement devices 18 and 34 or 38 (synchronous movement in the x-direction, for example). To process the containers 12, the respective processing unit 22 can be lowered towards the respective container 12 by means of the respective movement device 34 or 38. After the processing of the container 12, the respective processing unit 22 can be removed from the respective container 12 by means of the respective movement device 34 or 38, e.g. movement in the z-direction.

The processing units 22 are preferably filling units for filling the containers 12. Other or additional processing units 22 are also possible (e.g. container production unit (e.g. stretch blow-molding station), testing unit, printing unit, etc.). The filling units can be supplied with different filling media via flexible hose lines. It is possible that a weighing function for weighing the containers 12 is integrated into the movement devices 18. Thus, for example, weight-dependent filling by means of the filling units can be controlled.

It is possible that the base element 16 has a buffer or a buffer track for buffering containers 12 on the movement devices 18. The buffer or buffer track can be arranged centrally with respect to the base element 16, for example.

Container processing system 10I permits particularly flexible association of individually movable processing units 22 with individually movable containers 12. The containers 12 can be flexibly assigned to a corresponding processing unit 22 in accordance with the desired processing profile. The containers 12 can move along with the associated processing units 22, thereby enabling "continuous cycling". Output performance can advantageously be increased by the "continuous cycling" (continued travel during processing).

Figure 10:
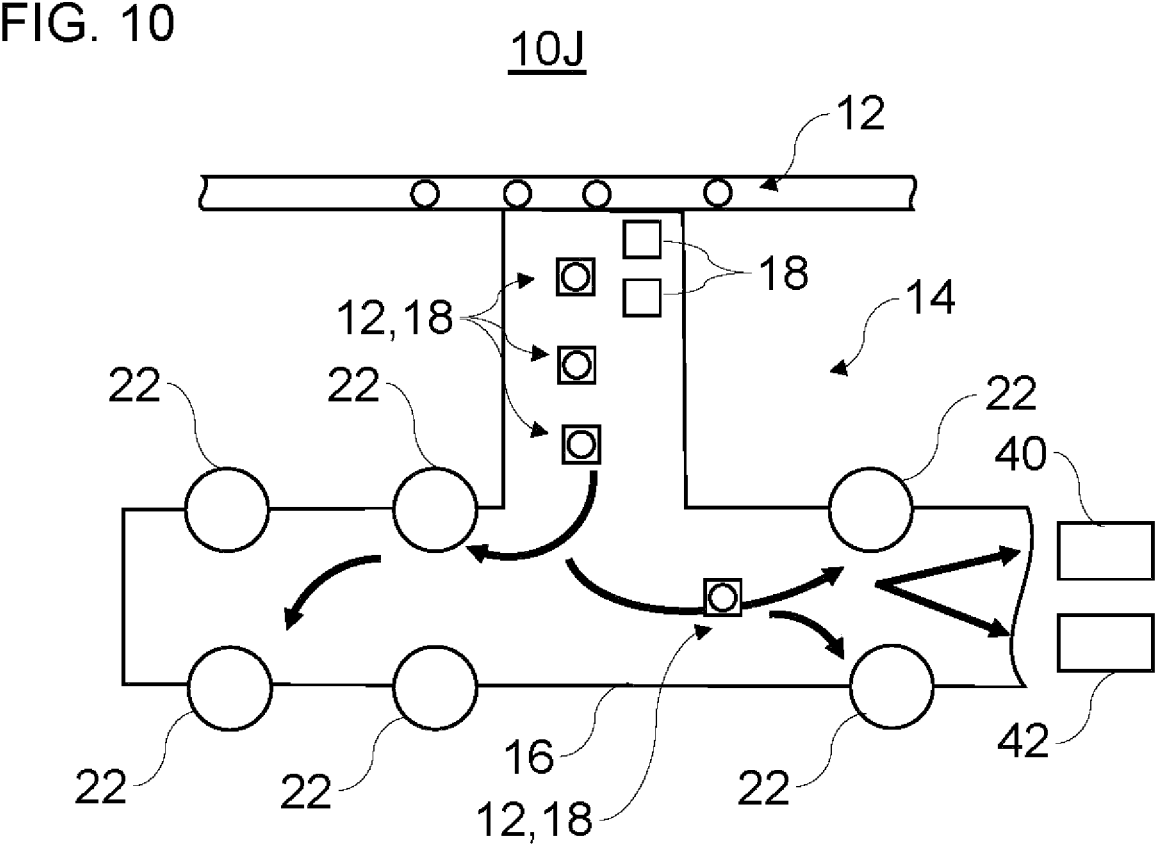
FIG. 10 shows a schematic plan view of a container processing system.

FIG. 10 shows a container processing system 10J.

The processing units 22 are preferably all embodied as testing units, e.g. measuring stations. By means of the movement devices 18, the containers 12 can be moved to one or more of the testing units, in accordance with a desired processing profile, for example. At least some of the testing units are of different designs in order to test different aspects of the containers 12. Container processing system 10J can thus advantageously be embodied as an automated testing laboratory which can be of flexible construction.

Depending on the test result from the testing units, the containers 12 can be passed on. As long as the container 12 has successfully passed all the tests, the container 12 can, for example, be moved back to the original flow of containers or a separate discharge conveyor (not illustrated in FIG. 10). If a test reveals a fault, the container 12 can be removed. In this case, removal can depend on the respective fault (e.g. underfilling, overfilling, oblique closure seating, crack in the container, etc.). Depending on the respective fault, the container 12 can be transferred, e.g. to one of a plurality of removal systems 40, 42 (e.g. removal conveyors or removal regions), and thus preferably removed according to the (category of) fault.

Figure 11:
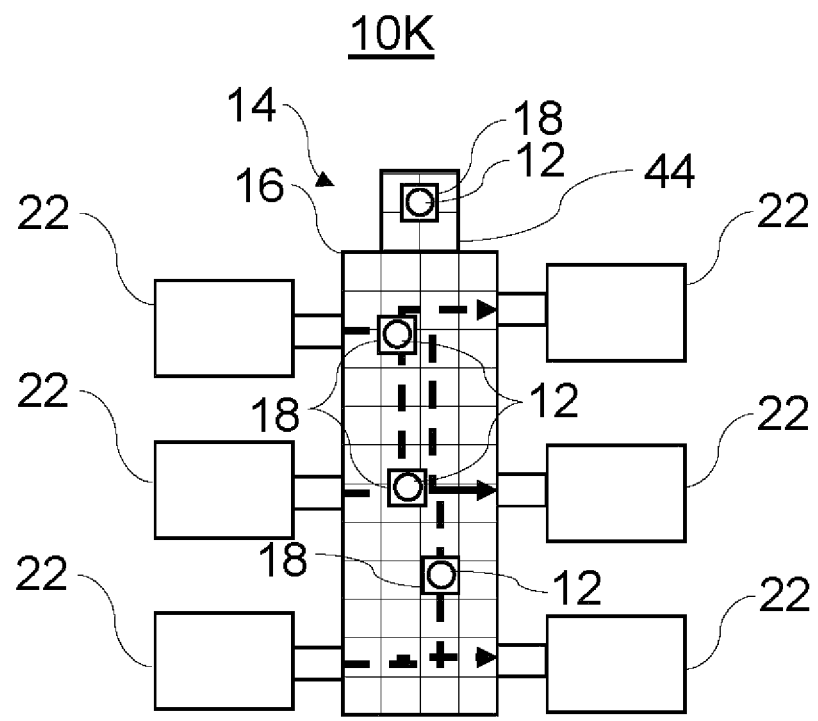
FIG. 11 shows a schematic plan view of a container processing system.

FIG. 11 shows a container processing system 10K.

Container processing system 10K is constructed as a flexible line interface in a manner similar to container processing system 10G of FIG. 7. In contrast to container processing system 10G, the processing units 22 of container processing system 10K can process the containers 12 while they are being held by the movement devices 18.

The base element 16 has a buffer region 44, in which unused movement devices 18 can be parked or in which movement devices 18 with containers 12 can wait for the next desired processing unit 22 to become free.

Figure 12A:
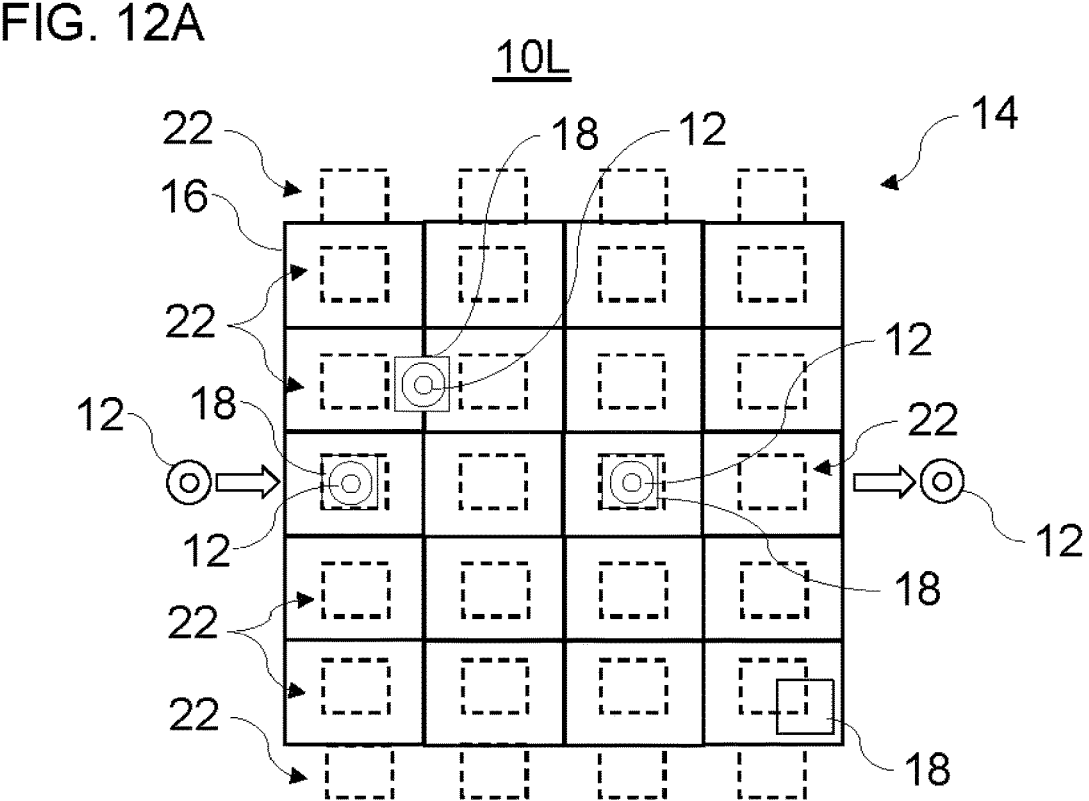
FIG. 12A shows a schematic plan view of a container processing system.
Figure 12B:
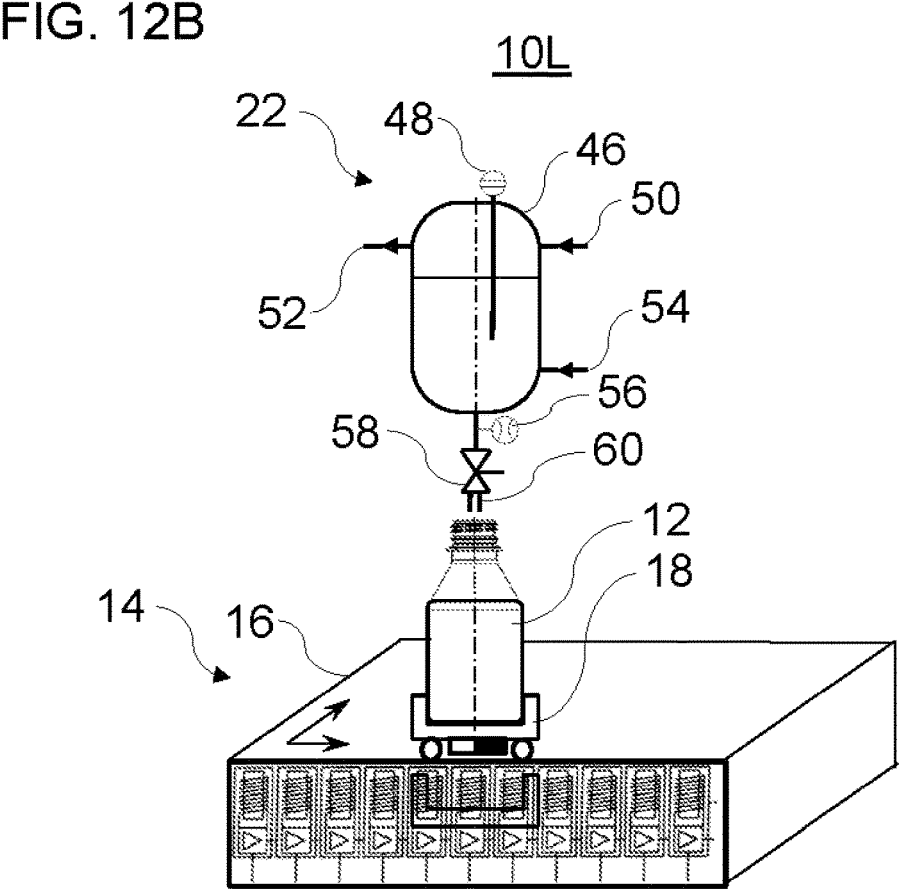
FIG. 12B shows a perspective view of a section of the container processing system of FIG. 12A.

FIG. 12A shows a container processing system 10L, and FIG. 12B shows a section of container processing system 10L.

The base element 16 is formed by a chequerboard-like combination of tiles. A plurality of processing units 22 is arranged, e.g. suspended, above the base element 16. The processing units 22 arranged above the base element 16 are preferably designed as filling units for filling the containers 12. The processing units 22 can preferably be arranged in a plurality of rows and columns above the base element 16 in a chequerboard-like manner. In addition, a plurality of processing units 22, such as, for example, testing units, labelling units, printing units, container rinsing units, container disinfection units, closing units, etc., can also be arranged laterally on the base element 16.

The containers 12 are each moved by the movement devices 18 to a desired selection of processing units 22, in accordance with the respectively desired processing profile. Positioned below a filling unit, the container 12 can be filled by the respective filling unit. It is possible that different filling units are approached one after the other in order to fulfil a recipe for filling the container. For example, still water, at least one syrup, at least one flavoring and/or carbonated water can be introduced in succession from different filling units into a container 12, depending on the recipe or processing profile. Before being filled with carbonated water, the container 12 can preferably be weighed in order to check the filling quantity and enable the individual filling inaccuracies to be compensated in the last filling step. For example, a weighing device integrated in the movement devices 18 can be used for weighing.

FIG. 12B illustrates in detail a processing unit 22 designed as a filling unit.

The processing unit 22 has a liquid reservoir 46, a filling level sensor 48, a shielding gas feed 50, a shielding gas discharge 52 and a liquid feed 54.

The liquid to be introduced into the containers 12 can be stored in the liquid reservoir 46. The liquid can be fed into the liquid reservoir 46 via the liquid feed 54. The filling level sensor 48 can detect a liquid filling level of the liquid reservoir 46 in order, for example, to adapt the liquid feed. The filling level sensor 48 can be embodied as a height probe, for example. Via the shielding gas feed 50, a shielding gas, e.g. nitrogen, can be fed to the liquid reservoir 46. Via the shielding gas discharge, the shielding gas can be discharged from the liquid reservoir 46. The shielding gas avoids contact between the liquid and the ambient air, which may be damaging to the liquid.

The processing unit 22 has a flow meter 56, a filling valve 58 and an outlet 60. As soon as a container 12 has been positioned below the outlet 60 by a movement device 18, the filling valve 58 can be opened. Liquid flows out of the liquid reservoir 46 and the outlet 60 into the container 12. The flow meter 56 detects the amount of liquid leaving the liquid reservoir 46 in the direction of the outlet 60. Based on detection by the flow meter 56, the filling valve 58 can be closed when a desired amount of liquid for filling the container 12 has been detected. Precise metering is advantageously made possible in this way.

It is possible that movement devices 18 may be moved to a park position on the base element 16, see, for example, the movement devices 18 at the bottom right of FIG. 12A.

Processing system 10L advantageously allows a very compact construction of a filling system by means of the chequerboard arrangement of processing units 22 above the base element 16. The travel paths are not track-bound, as in the case of a conventional container processing system; instead, the optimum travel path for each container 12 can be set up on the transport system. Moreover, the system can continuously optimize itself. Processing system 10L is of modular construction, and individual processing units 22 can be quickly built, converted or connected and disconnected to and from it for this purpose. Cross-contamination between the individual filling or processing units is not possible since a separate line (metering unit) can be provided for each filling material. Different recipes with different processing or filling times have no effect on the overall throughput of processing system 10L. In addition, a high degree of individualization is possible, preferably in combination with digitally printed labels.

Figure 13A:
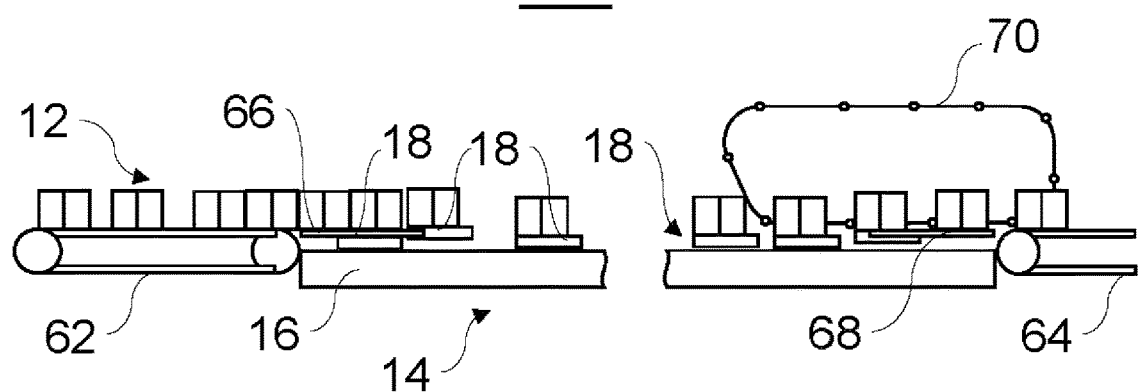
FIG. 13A shows a schematic side view of a container processing system.
Figure 13B:
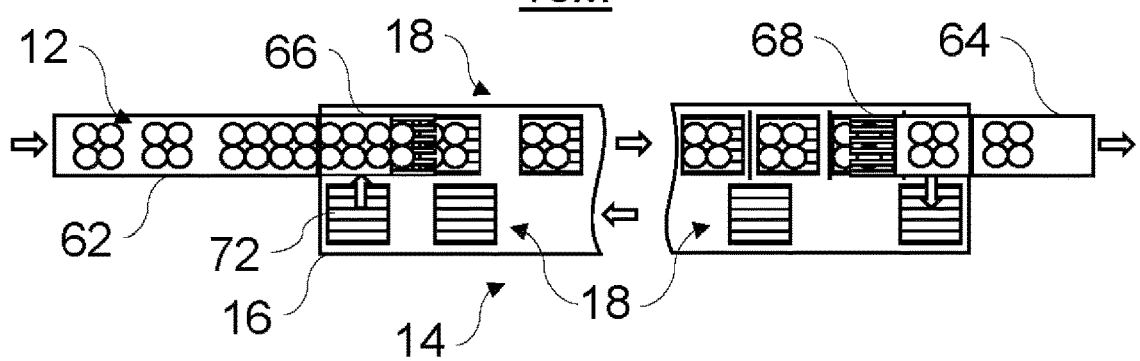
FIG. 13B shows a plan view of the container processing system of FIG. 13A.

FIGS. 13A and 13B show a container processing system 10M. For the sake of simplicity, container processing system 10M is illustrated without processing units, or only the container transfer regions are illustrated.

Container processing system 10M has an infeed conveyor 62 (e.g. belt conveyor) and an outfeed conveyor (e.g. belt conveyor) 64. The infeed conveyor 62 has an outlet region 66 (e.g. cross-transfer plate) for transferring the containers 12 to the movement devices 18. The outfeed conveyor 64 has an inlet region 68 (e.g. cross-transfer plate) for taking over containers from the movement devices 18. The outlet region 66 and the inlet region 68 are comb-shaped. The outlet region 66 and the inlet region 68 are arranged above the base element 16. In addition, a pushing device 70, e.g. a pushing chain with pushing beams, can be arranged above the inlet region 68 and the base element 16. The pushing device 70 can have a conveying direction which corresponds to a conveying direction of the outfeed conveyor 64. A support surface 72 of the movement devices 18 for the containers 12 is formed by a plurality of webs.

The infeed conveyor 62 conveys the containers 12 individually or in bundles at a constant speed onto the comb-shaped outlet region 66. The movement devices 18 are moved below the outlet region 66. The movement devices 18 move synchronously with the containers 12 in the conveying direction of the infeed conveyor 62. The movement devices 18 perform an upward stroke motion relative to the base element 16. The movement devices 18 thus increase their hovering height. During this process, the webs of the support surface 72 pass through the comb-shaped outlet region 66. The containers 12 are raised by the support surface 72. The containers 12 can thus be taken over from the outlet region 66 onto the support surface 72 of the movement devices 18. During the entire takeover process, the containers 12 and the movement devices 18 can move at an identical path speed. After the containers have been taken over, the respective movement device 18 can reduce the hovering height relative to the base element 16 again and can be moved at a desired (e.g. increased) speed to a desired processing unit (not illustrated in FIGS. 13A and 13B). In the meantime, the following movement device 18 can already synchronize with the next container or containers 12 to be taken over.

Container transfer from the movement devices 18 to the outfeed conveyor 64 can take place substantially in the reverse order to container takeover. The movement devices 18 move into the comb-shaped inlet region 68 at an increased hovering height and are then lowered with respect to the base element 16. A pushing beam of the pushing device 70 pushes the containers 12 over the inlet region 68 onto the outfeed conveyor 64, e.g. at a constant speed. The empty movement devices 18 then move back to the outlet region 66 of the infeed conveyor 66 in order to take over the next container(s) 12.

As a result of the continuous takeover and transfer principle, a considerable increase in throughput is achieved in comparison with a cyclical system (with deceleration of the movement devices to a standstill for container transfer and subsequent acceleration, for example), as a result of which the efficiency of the planar drive system 14 is also better utilized. In addition, the risk of overturning in the case of containers 12 of low stability (e.g. empty, tall, and/or narrow containers 12) can be reduced in comparison with cyclical systems, thereby likewise making it possible to increase throughput.

Figure 14A:
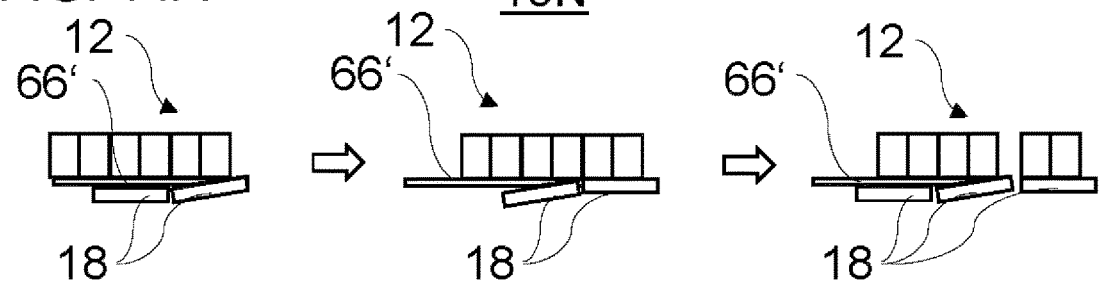
FIG. 14A shows a side view of a container takeover region of a container processing system in three consecutive process steps.
Figure 14B:
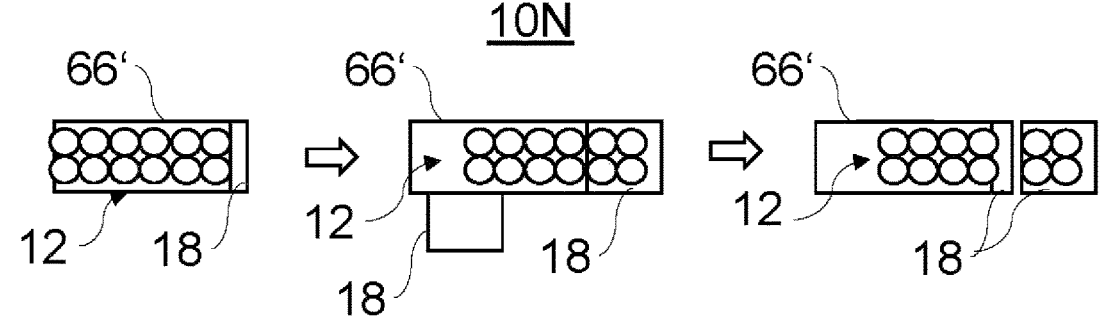
FIG. 14B shows a plan view of three process steps of the container processing system of FIG. 14A.

FIGS. 14A and 14B show container takeover in three process steps in a container processing system 10N shown only in segments. For the sake of simplicity, container processing system 10N is illustrated without processing units, or only the container takeover region is illustrated.

In contrast to outlet region 66, outlet region 66' has a beveled underside. The underside preferably tapers to a free (outlet) end of the outlet region 66'. The support surfaces of the movement devices 18 can be embodied as flat surfaces, for example.

The infeed conveyor 62 (not illustrated in FIGS. 14A and 14B) conveys the containers 12 individually or in bundles at a constant speed onto the outlet region 66'. The movement devices 18 are moved below the outlet region 66'. The movement devices 18 move synchronously with the containers 12 in the conveying direction of the infeed conveyor 62. The movement devices 18 are aligned at an angle to the base element 16 (not illustrated in FIGS. 14A and 14B) according to the slope of the underside of the outlet region 66'. The movement devices 18 furthermore perform an upward stroke motion relative to the base element 16. The movement devices 18 thus increase their hovering height. The movement devices 18 thus move along the beveled underside and emerge directly at the free end of the outlet region 66'. Here, the containers 12 are then pushed onto the emerging movement devices 18. During the entire takeover process, the containers 12 and the movement devices 18 can move at an identical path speed. After the containers have been taken over, the respective movement device 18 can reduce the hovering height relative to the base element 16 again and can be moved at a desired (e.g. increased) speed to a desired processing unit (not illustrated in FIGS. 14A and 14B). In the meantime, the following movement device 18 can already synchronize with the next container or containers 12 to be taken over.

Figure 15A:
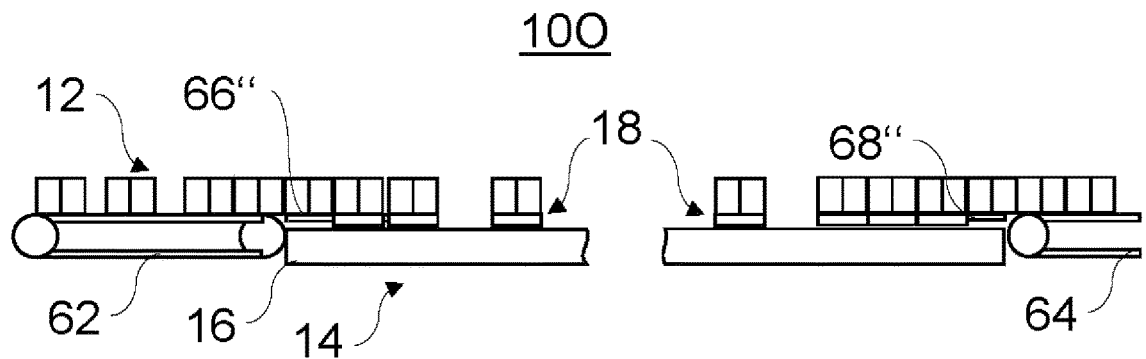
FIG. 15A shows a side view of a container processing system.
Figure 15B:
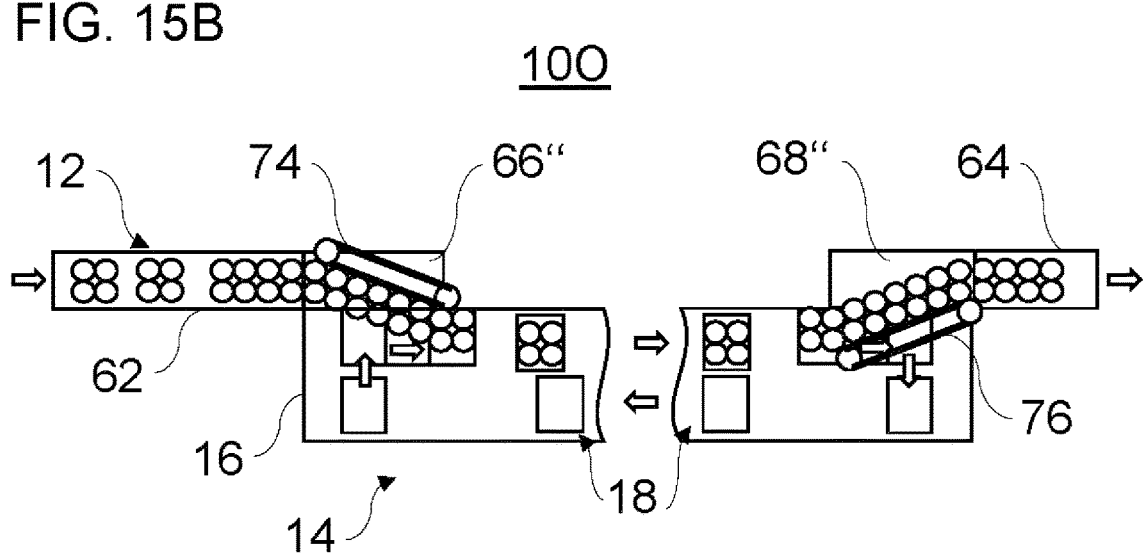
FIG. 15B shows a plan view of the container processing system of FIG. 15A.

FIGS. 15A and 15B show a container processing system 10O. For the sake of simplicity, container processing system 10O is illustrated without processing units, or only the container transfer regions are illustrated.

Container processing system 10O has a first cross-transfer unit 74 and a second cross-transfer unit 76. Cross-transfer unit 74 is arranged transversely above the outlet region 66". Cross-transfer unit 76 is arranged above the base element 16 to the side of the inlet region 68". Cross-transfer unit 76 extends transversely to the inlet region 68". Cross-transfer units 74, 76 can be embodied as conveyor belts or container rails, for example.

The infeed conveyor 62 conveys the containers 12 individually or in bundles at a constant speed onto the outlet region 66". The movement devices 18 are moved laterally next to the outlet region 66". The movement devices 18 move synchronously with the containers 12 in the conveying direction of the infeed conveyor 62. Cross-transfer unit 74 guides the containers 12 moving in the conveying direction of the infeed conveyor 62 on the outlet region 66" onto the movement devices 18 transversely to the conveying direction. The containers 12 can thus be taken over from the outlet region 66" onto the movement devices 18. During the entire takeover process, the containers 12 and the movement devices 18 can move at an identical path speed. After the containers have been taken over, the respective movement device 18 can move away from the outlet region 66' and can be moved at a desired (e.g. increased) speed to a desired processing unit (not illustrated in FIGS. 15A and 15B), etc.

Container transfer from the movement devices 18 to the outfeed conveyor 64 can take place substantially in the reverse order to container takeover. The movement devices 18 move laterally next to the inlet region 68". Cross-transfer unit 76 guides the containers 12 transversely to the conveying direction onto the inlet region 68". During this process, the movement devices 18 can move at a speed that is substantially equal to a conveying speed of the outfeed conveyor 64. The empty movement devices 18 then move back to the outlet region 66" of the infeed conveyor 62 in order to take over the next container(s) 12.

Figure 16:
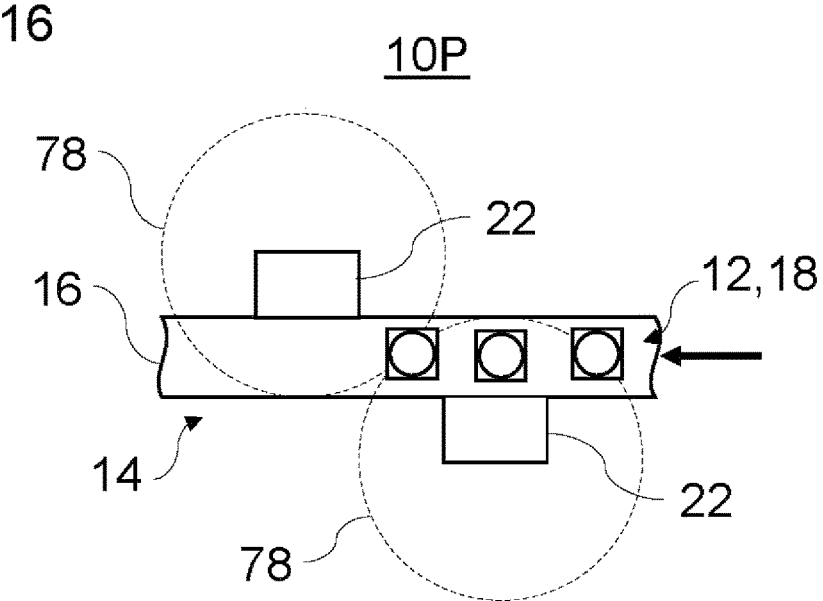
FIG. 16 shows a plan view of a section of a container processing system.

FIG. 16 shows a section of a container processing system 10P.

Container processing system 10P is used by way of example to illustrate how the use of the planar drive system 14 can simplify the construction of a container processing system. Specifically, the planar drive system 14 can be used in such a way that it can replace the conventionally used transfer stars or carousel processing units 78 (illustrated by dashed lines in FIG. 16). Instead of container conveyance by means of rotating star conveyors or carousel processing units 78, the containers 12 can be moved to the desired processing units 22 by means of the movement devices 18.

Advantageously, the movement devices 18 can also compensate in this case for differences in height by means of relative stroke motions with respect to the base element 16. Likewise, container transfer to match the spacing can be accomplished, and this can also be adapted easily in terms of control engineering. Decoupling is not required. Safety zones or buffer zones are not necessary, or are at least necessary only to a small extent. As a result, construction can be significantly more compact, which can be very relevant for block systems, for example. In addition, high hygiene requirements can be met by the planar drive system 14.

Figure 17A:
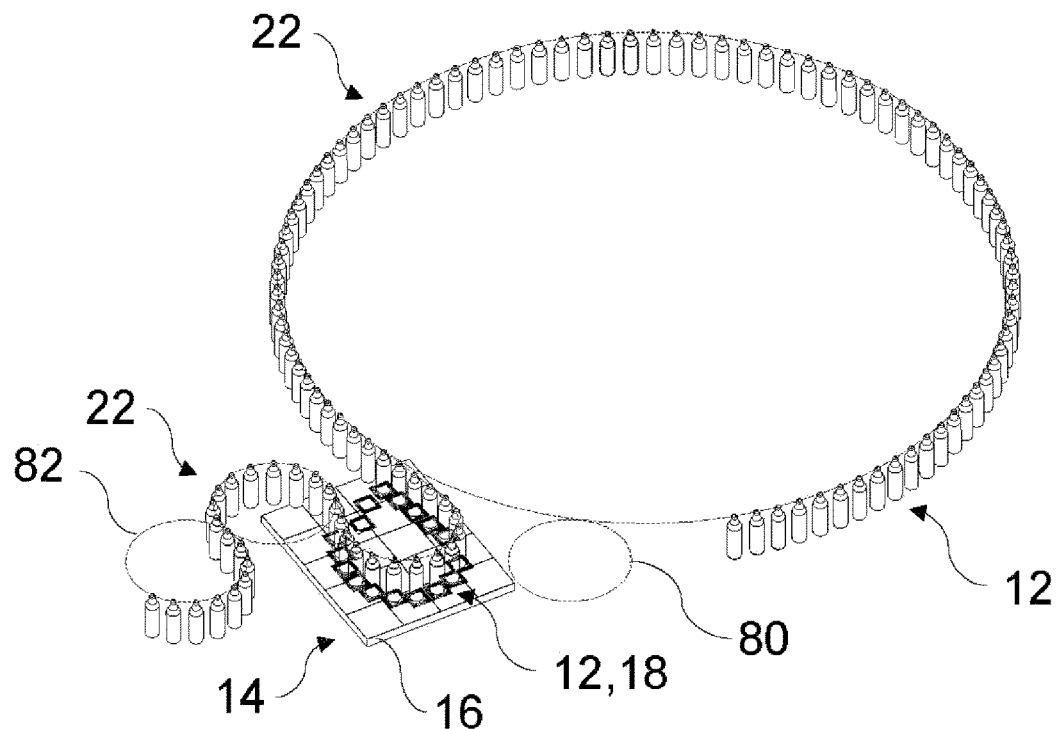
FIG. 17A shows a perspective view of a container processing system.
Figure 17B:
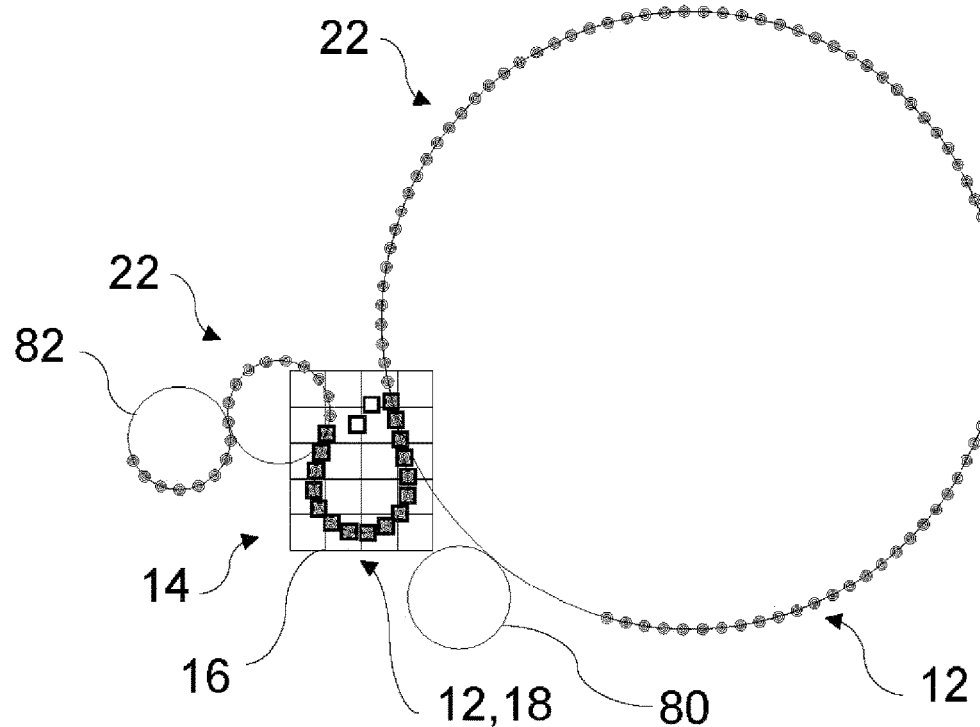
FIG. 17B shows a plan view of the container processing system of FIG. 17B.

FIGS. 17A and 17B show a container processing system 10Q.

Container processing system 10Q has, for example, a processing unit 22 (large circle with reference sign 22 in FIGS. 17A and 17B) embodied as a filling unit, preferably a filler carousel, and a processing unit 22 (small circle with reference sign 22 in FIGS. 17A and 17B) embodied as a closing unit, preferably a closer carousel. The processing units 22 are connected to one another by means of the planar drive system 14. The container processing system 10Q can have further processing units connected to the planar drive system 14 (not illustrated in FIGS. 17A and 17B for the sake of simplicity). An infeed transfer star 80 can be arranged upstream of the processing unit 22 embodied as a filling unit. An outfeed transfer star 82 can be arranged downstream of the processing unit 22 embodied as a closing unit.

By means of the movement devices 18, the planar drive system 14 can take over the filled and unsealed containers 12 from the filling unit, move them to the closing unit and transfer them to the closing unit for closing the containers 12. The containers 12 can be held on the movement devices 18 by means of any suitable holder. Preferably, each movement device 18 can transport one of the containers 12.

The planar drive system 14 makes it possible for the containers 12 to be moved by means of the movement devices 18 in a plane on any desired path or curve from the filling unit to the closing unit or, in general, from one processing unit 22 to the next processing unit 22. The path can therefore be configured in an optimum manner as required, preferably in order to prevent the containers 12 from spilling over or tipping over.

Specifically, the transition between the filler carousel and the closer, in particular, is normally problematic, particularly in high-output machines. The filled, unsealed container normally leaves the filler carousel via a discharge star. The container is transferred directly from the discharge star to the closer. At the two transfer points of the discharge star, the container undergoes a change in acceleration. This often leads to an unintentional sloshing of the liquid out of the container. Alternative concepts, such as transferring the container from the filler carousel to the closer by means of a long stator linear motor (LLM), often fail in practice because of the lack of flexibility of these systems. Owing to the limited number of segment variants (usually 3-5 units), the route can only be adapted to the technically expedient optimum to a very limited extent.

In contrast, in the case of processing unit 10Q, the path of the containers 12/ of the movement devices 18 can be adapted by the control unit 20 (not illustrated separately in FIGS. 17A and 17B) of the planar drive system 14, for example in such a way that the transverse acceleration acting on the respective container 12 is minimized. It is also possible for the movement devices 18 to be inclined relative to the base element 16 in such a way during the transport of the containers 12 that a risk of spilling over is further reduced. It is likewise possible that a spacing between the containers 12 (distance of the containers 12 relative to one another) during the movement by means of the movement devices 18 is adapted, as desired, to a spacing of the closing unit, e.g. is reduced or increased. It is also possible to reduce the path speed of the movement devices 18 during the transport of the containers 12, and this likewise reduces transverse accelerations during cornering. It may likewise be advantageous to reduce the speed of the movement devices 18 in the region of a processing unit embodied as a nitrogen dropper (not illustrated in FIGS. 17A and 17B) since the nitrogen can then be metered more precisely into the containers 12. At the end of the path, the movement devices 18 can transfer the containers 12 to the closing unit or, more generally, to the next desired processing unit 22 in the desired orientation, with the desired spacing and the desired speed.

It is possible that the movement devices 18 have a mechanical guide (not illustrated in FIGS. 17A and 17B), e.g. in the form of a mechanical undercarriage (e.g. with wheels, rollers, or shoes). The mechanical guide can physically support the movement devices 18 on the base element 16. The planar drive system 14 then essentially also takes over the propulsion of the movement devices 18. The mechanical guide can increase the payload of the movement devices 18 as well as overall process reliability/robustness.

FIGS. 18 and 19A to 19C show a container processing system 10R or a segment thereof.

Container processing system 10R can have a processing unit 22 with a plurality of processing stations 84. The processing unit is preferably embodied as a rotatable carousel (e.g. a filler carousel) or rotary unit, in which the processing stations 84 can rotate on a circular path together with the containers 12 to be processed. Purely by way of example, the processing stations 84 are embodied as filling stations for filling the containers 12.

The processing stations 84 can each have a support surface 86 for supporting the containers 12 at the bottom. The support surface 86 can be formed by a plurality of, preferably parallel, webs. The webs are preferably connected to one another in such a way that the support surface 86 has a rake shape or comb shape.

The movement devices 18 can likewise each have a support surface 72 for the containers 12. The support surface 72 can be formed by a plurality of, preferably parallel, webs. The webs are preferably connected to one another in such a way that the support surface 72 has a rake shape or comb shape.

Optionally, the movement devices 18 can have a container holder 88. The container holder 88 can be arranged above the support surface 72 of the respective movement device 18. The container holder 88 can hold the container 12 laterally, e.g. on the container body or on the container neck. The container holder 88 preferably has a container clamp. The container clamp can be, for example, an active clamp which can be actuated actively for opening and/or closing. Alternatively, the container clamp can be, for example, a passive clamp which is preferably preloaded (e.g. spring-loaded) for closing. Particularly preferably, a container 12 can be clamped between the support surface 72 and the container holder 88. For example, the container holder 88 can hold the container 12 directly above a neck ring of the respective container 12.

It is possible that the container holder 88 includes a container neck clamp arranged on the container neck to hold a container 12, and a container body clamp arranged on the container body to hold the container 12.

In order to take over a container 12, a respective movement device 18 can move along with a processing station 84. In this case, the movement device 18 can be moved relative to the processing station 84 in such a way that support surface 72 enters support surface 86. For example, the movement device 18 can be inclined and/or can reduce a distance from the base element 16 during this process. During entry, the respective webs of the support surfaces 72, 86 can mesh with one another. After support surface 72 has entered support surface 86, the movement device 18 can make a stroke motion upwards, e.g. a pure vertical movement or a tilting movement or a tipping movement upwards into a horizontal orientation of the movement device 18 or beyond. During this process, support surface 72 can take over the container 12 from support surface 86. Additionally, the optional container holder 88 can close when the container 12 is supported on support surface 72.

Figure 20:
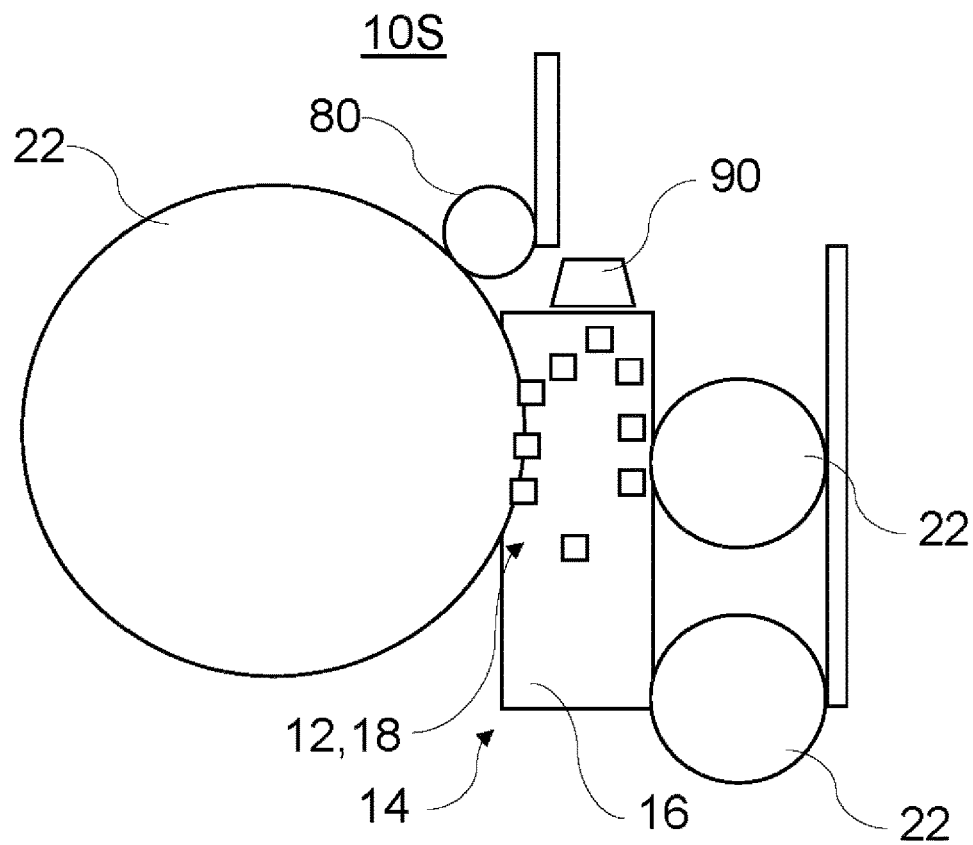
FIG. 20 shows a plan view of a container processing system.

FIG. 20 shows a container processing system 10S similar to the container processing system 10Q of FIGS. 17A and 17B.

Container processing system 10S can have, for example, a processing unit 22 embodied as a filling device, preferably a filler carousel (on the left in FIG. 20) and processing units 22 embodied as first and second closing units, preferably a closer carousel (on the right in FIG. 20). The two closing units can be of the same or different designs. The two closing units can be loaded with the same or different closures (e.g. corks, crown corks, caps or screw caps). The two closing units can close the containers 12, and the closed containers 12 can be transported away by one or more discharge conveyors.

Figure 18:
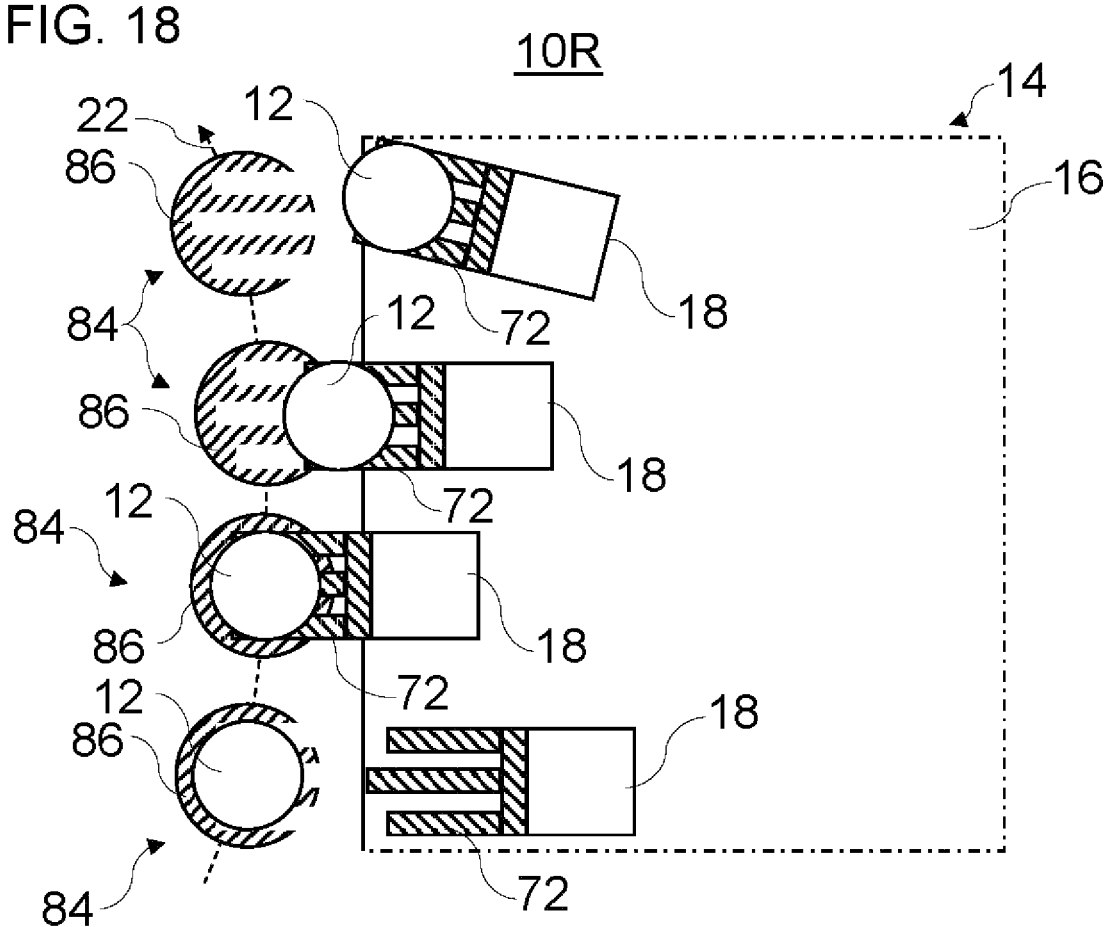
FIG. 18 shows a plan view of a section of a container processing system.
Figure 19A:
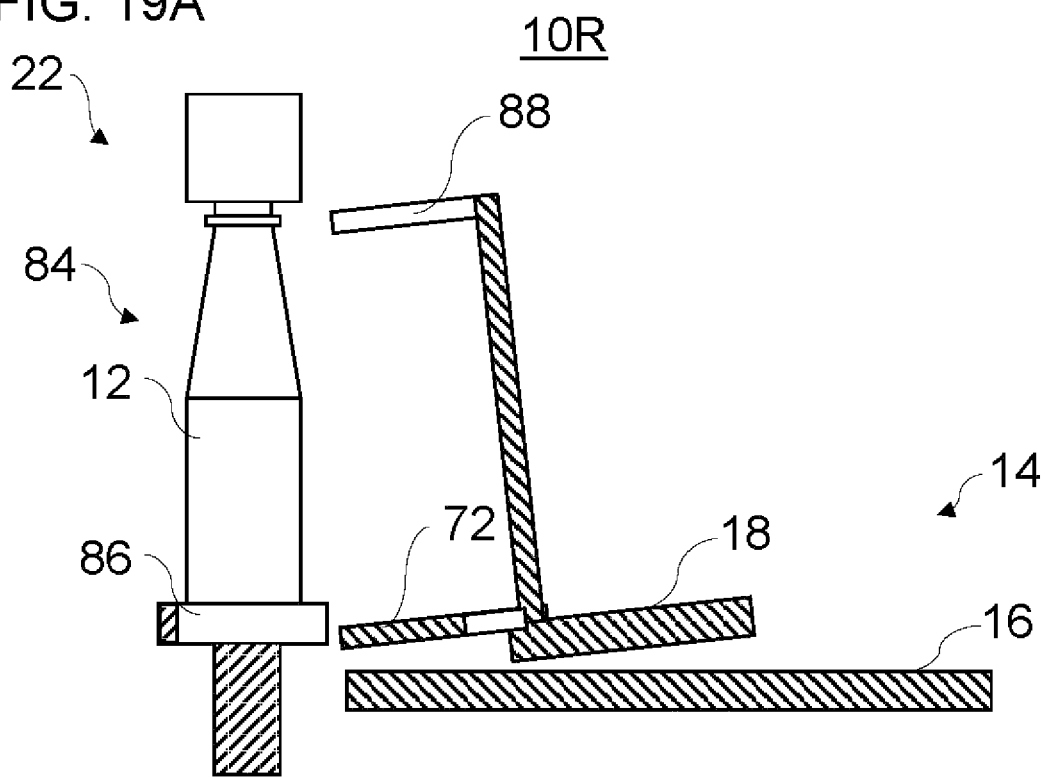
FIGS. 19A-19C show side views of a section of a container processing system in three consecutive process steps during container takeover.
Figure 19B:
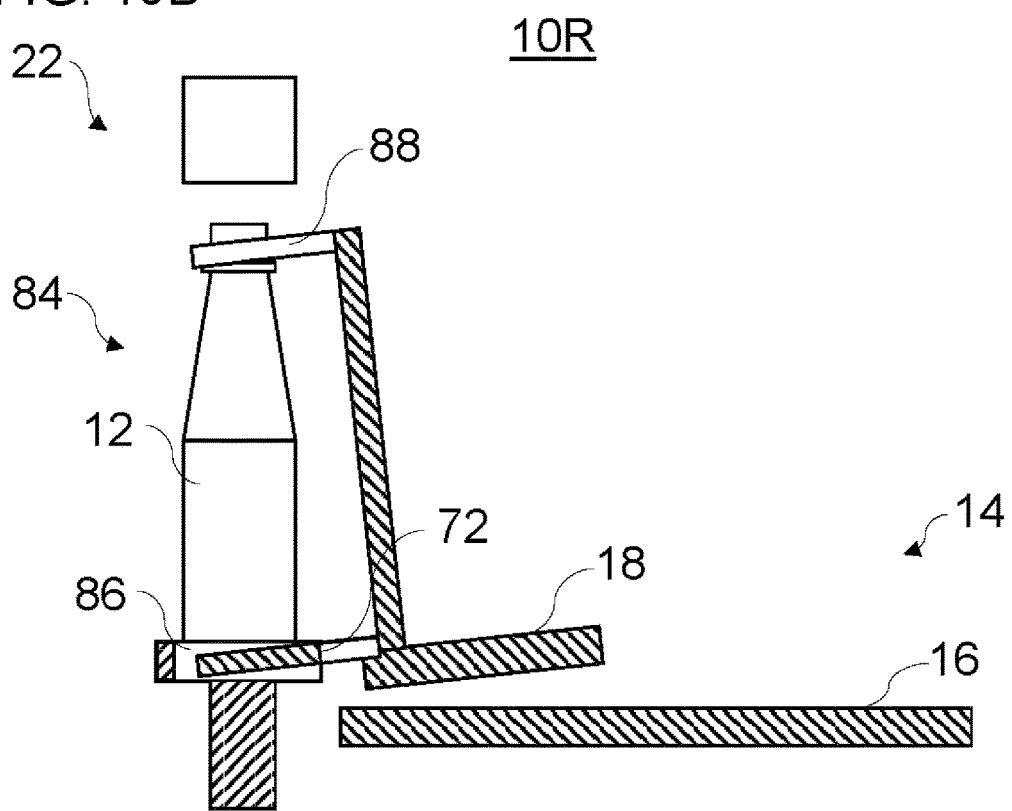
Figure 19C:
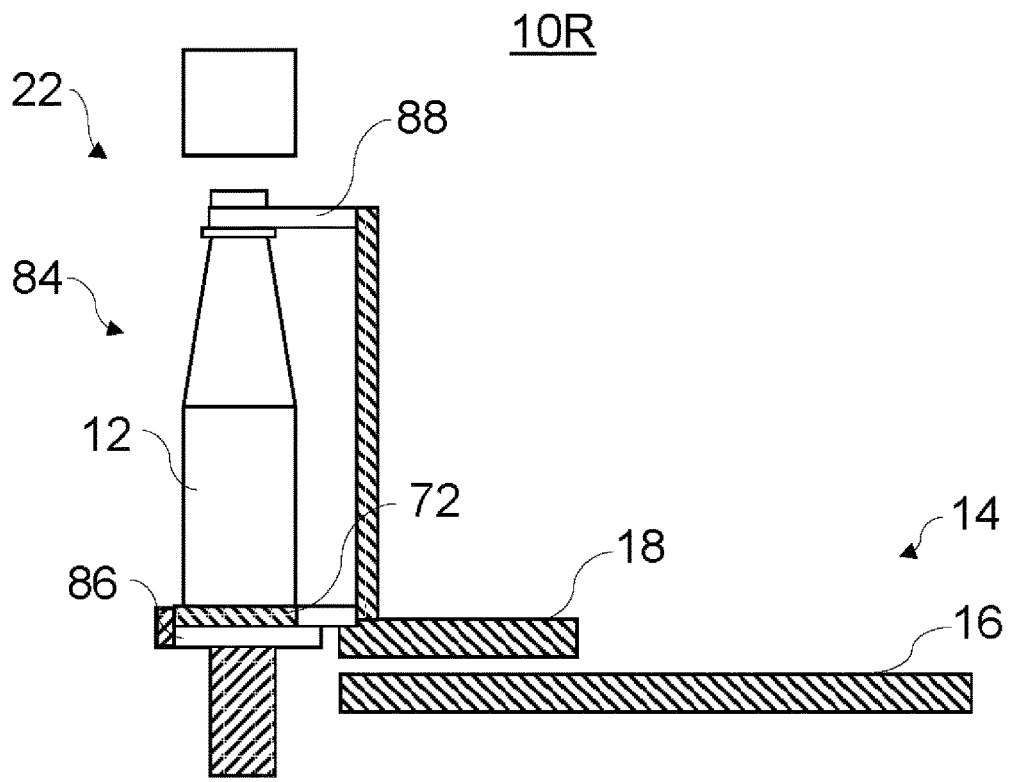

The movement devices 18 can take over the containers 12 from the filling device, e.g. by means of the technique described with reference to FIGS. 18 to 19C. The movement devices 18 can move the containers 12 selectively to the first or the second closing unit, e.g. depending on the processing profile. The movement devices 18 can transfer the containers 12 to the closing units.

Container processing system 10S can have a detection unit 90, e.g. a camera device and/or at least one other sensor. By means of the detection unit 90, it is possible, for example, to analyze or monitor sloshing behavior of the containers 12 in order to prevent the containers from spilling over. Based on detection by the detection unit 90, the path of the containers 12 or of the movement devices 18 can be adapted. Thus, as has already been described with reference to FIGS. 17A and 17B, it is possible, for example, to minimize the transverse acceleration acting on the respective container 12, to reduce a risk of spilling, to adapt a spacing between the containers 12 (distance of the containers 12 relative to one another) as desired to a spacing of the closing unit during the movement by means of the movement devices 18, etc.

Figure 21:
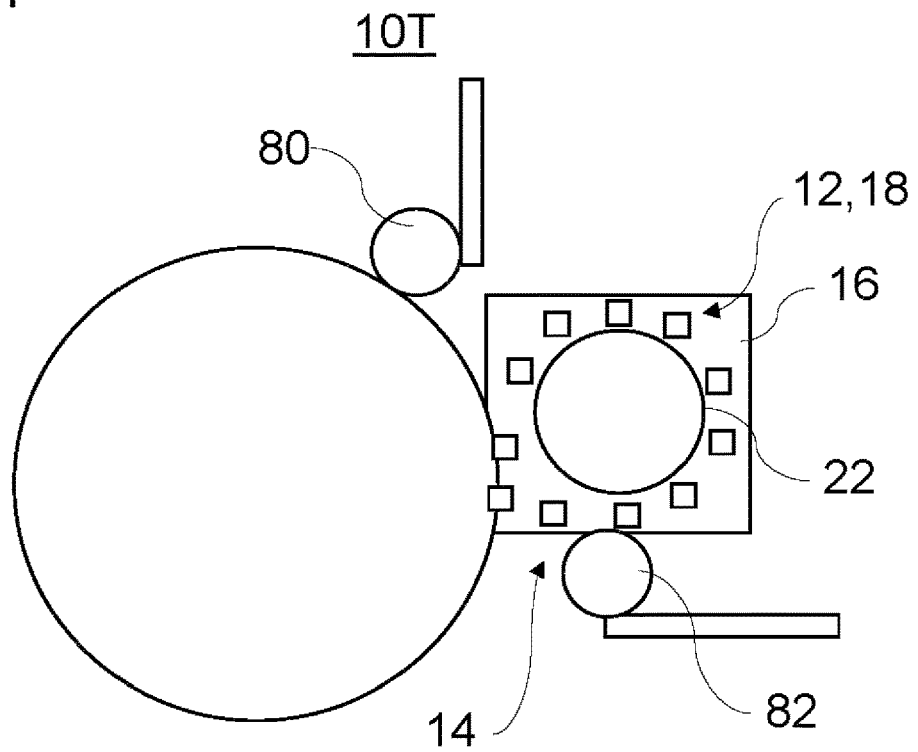
FIG. 21 shows a plan view of a container processing system.

FIG. 21 shows a container processing system 10T. Container processing system 10T has a processing unit 22 (on the right in FIG. 21), which is preferably embodied as a closing unit. The processing unit 22 is embodied as a rotary unit. The movement devices 18 do not transfer the containers 12 to this processing unit 22 for processing but themselves transport the containers 12 on a circular path around this processing unit 22 during container processing by this processing unit 22. The other processing unit 22 (on the left in FIG. 21) can be embodied as a filler carousel, for example.

Figure 22:
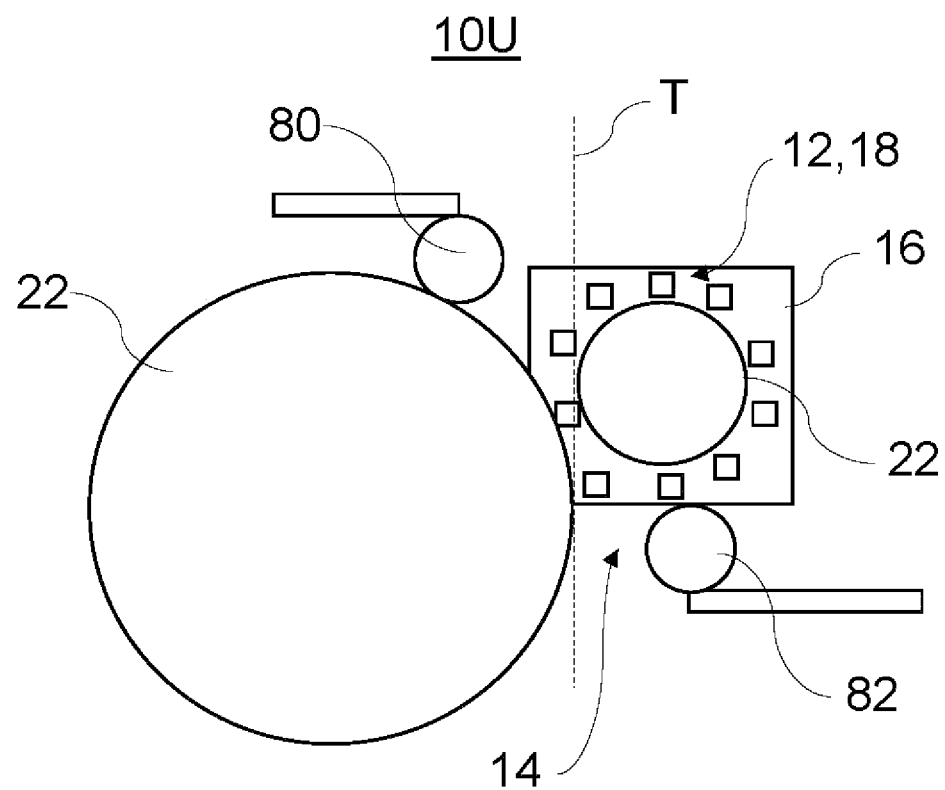
FIG. 22 shows a plan view of a container processing system.

FIG. 22 shows a container processing system 10U. The containers 12 can be moved by the movement devices 18, after being taken over from the processing unit 22, on a tangent T to the circular path of the processing unit 22, which is embodied as a rotary unit, preferably a filler carousel, to the next processing unit (e.g. a closer) 22. In this way, it is preferably possible to prevent the containers 12 from spilling over. It is possible for the movement devices 18 to be rotated, for example by 180°, about an axis thereof, e.g. a vertical axis, during movement between the processing units 22.

The invention is not restricted to the preferred exemplary embodiments described above. On the contrary, a large number of variants and modifications is possible which likewise make use of the concept of the invention and therefore fall within the scope of protection. In particular, the invention also claims protection for the subject matter and the features of the dependent claims independently of the claims referred to. In particular, the individual features of independent Claim 1 are each disclosed independently of one another. In addition, the features of the dependent claims are also disclosed independently of all the features of independent Claim 1 and, for example, independently of the features relating to the presence and/or configuration of the plurality of processing units and/or of the planar drive system of independent Claim 1. In particular, all the techniques of the dependent claims are also disclosed independently of the presence of the plurality of processing profiles.

LIST OF REFERENCE SIGNS 10A-10U container processing system
12 container
14 planar drive system
16 base element
18 movement device
20 control unit
22 processing unit
24 elevator unit
26 container conveyors
28 second planar drive system
30 third planar drive system
32 base element
34 movement device
36 base element
38 movement device
40 removal system
42 removal system
44 buffer region
46 liquid reservoir
48 level sensor
50 shielding gas feed
52 shielding gas discharge
54 liquid feed
56 flow meter
58 filling valve
60 outlet
62 infeed conveyor
64 outfeed conveyor
66 outlet region
68 inlet region
70 pushing device
72 support surface
74 cross-transfer unit
76 cross-transfer unit
78 transfer star/carousel processing unit
80 infeed transfer star
82 outfeed transfer star
84 processing station
86 support surface
88 container holder
90 detection unit

The invention claimed is:

1. A container processing system for processing containers, comprising:
a plurality of processing units for processing the containers; and
a planar drive system having a base element and a plurality of movement devices for transporting the containers, wherein the base element connects the plurality of processing units to one another and the plurality of movement devices can be moved independently of one another relative to the base element;
wherein the planar drive system is configured to move each of the plurality of movement devices individually to at least one of the plurality of processing units according to in each case an individually selected one of a plurality of processing profiles for different container processing, wherein each of the plurality of processing profiles is configured to direct the planar drive system to move a selected one or more of the plurality of movement devices for which a respective processing profile has been individually selected to a unique selection of the plurality of processing units.

2. The container processing system according to claim 1, wherein:
each of the selection of the plurality of processing profiles has at least two different processing units of the plurality of processing units; and/or
each of the plurality of processing profiles has a sequence of the selected processing units.

3. The container processing system according to claim 1, wherein the plurality of processing units comprises at least one of:
a plurality of testing units for testing the containers;
a plurality of rinsing units for rinsing the containers;
a plurality of filling units for filling the containers;
a plurality of labelling units for labelling the containers;
a plurality of printing units for printing on the containers;
a plurality of closing units for closing the containers;
a plurality of grouping units for grouping the containers;
a plurality of packaging units for packaging the containers; and
a plurality of container production units or container conditioning units for producing or conditioning the containers.

4. The container processing system according to claim 1, wherein:
the planar drive system is arranged as a line interface with the plurality of processing units.

5. The container processing system according to claim 1, wherein:
the plurality of processing units has a rinsing unit for rinsing the containers; and
the plurality of movement devices can be moved upside down on the base element in a section downstream of the rinsing unit in order to empty the containers.

6. The container processing system according to claim 1, wherein:
the base element is oriented horizontally; and at least some of the plurality of processing units are arranged directly above the base element in a plurality of rows and a plurality of columns.

7. The container processing system according to claim 1, further comprising:
at least one further planar drive system having a further base element and a plurality of further movement devices, which transport the plurality of processing units, wherein the plurality of further movement devices can be moved independently of one another relative to the further base element.

8. The container processing system according to claim 7, wherein:
the containers can be moved jointly by use of the plurality of movement devices, and the plurality of processing units can be moved jointly by use of the plurality of further movement devices, during the respective container processing operation; and/or
the base element and the further base element are oriented in a manner inclined relative to one another.

9. The container processing system according to claim 1, wherein:
the base element has a plurality of vertically spaced planes;
at least some of the plurality of processing units are arranged on or at different planes of the plurality of vertically spaced planes; and
the container processing system has at least one elevator unit for the plurality of movement devices, wherein the at least one elevator unit connects the plurality of vertically spaced planes of the base element to one another.

10. The container processing system according to claim 1, further comprising:
a plurality of removal systems, which are connected to the planar drive system at different positions,
wherein the plurality of processing units comprises a plurality of testing units of different designs for testing different features of the containers, and
the planar drive system is configured, depending on a fault determined by use of one of the plurality of testing units, to move the respective container subject to the fault by use of one of the movement devices to a removal system of the plurality of removal systems which is associated with the fault.

11. The container processing system according to claim 1, wherein each of the plurality of movement devices has a support surface for the containers, which is formed by a plurality of webs, and the container processing system further comprises:
an infeed conveyor having a comb-shaped outlet region, wherein the planar drive system is configured so that, for container takeover, the plurality of container movement devices performs a stroke motion relative to the base element at the comb-shaped outlet region, such that the plurality of webs passes through the comb-shaped outlet region; and/or
an outfeed conveyor having a comb-shaped inlet region, wherein the planar drive system is configured so that, for container transfer, the plurality of movement devices performs a stroke motion relative to the base element at the comb-shaped inlet region, such that the plurality of webs emerges from the comb-shaped inlet region.

12. The container processing system according to claim 1, further comprising:
an infeed conveyor with an outlet region having a beveled underside,
wherein the planar drive system is configured, for container takeover, to move the plurality of container movement devices along the beveled underside of the outlet region in an inclined manner and by way of a stroke motion relative to the base element and to emerge directly downstream of the outlet region for container takeover from the outlet region.

13. The container processing system according to claim 1, further comprising:
an infeed conveyor having an outlet region and a cross-transfer unit which extends transversely over the outlet region, wherein the planar drive system is configured, for container takeover, to move the plurality of movement devices laterally next to the outlet region and to receive the containers pushed down from the outlet region by use of the cross-transfer unit; and/or
an outfeed conveyor having an inlet region and a cross-transfer unit which extends over the base element and laterally with respect to the inlet region, wherein the planar drive system is configured, for container transfer, to move the plurality of movement devices laterally next to the inlet region and to transfer the containers to the inlet region by use of the cross-transfer unit.

14. The container processing system according to claim 11, wherein:
the planar drive system is configured to synchronize the plurality of movement devices with a speed of the containers to be taken over on the outlet region during container takeover.

15. The container processing system according to claim 1, wherein:
the planar drive system is configured to incline the plurality of movement devices relative to the base element during acceleration and/or cornering; and/or
the planar drive system is configured to adapt a movement path of the plurality of movement devices in such a way that transverse acceleration on the transported containers is reduced to below a predetermined limit value; and/or
the planar drive system is configured to adapt a spacing of the transported containers to a spacing of a target processing unit of the plurality of processing units by use of the movement devices.

16. The container processing system according to claim 1, wherein:
each of the plurality of movement devices has a support surface for the containers which is formed by a plurality of webs, and optionally has a container holder.

17. The container processing system according to claim 16, wherein:
at least one processing unit has a plurality of processing stations, each of which has a support surface, formed by a plurality of webs, for the containers; and
the planar drive system is configured so that, for container takeover and/or container transfer, the plurality of movement devices performs a stroke motion and/or a tilting movement relative to the base element at the support surface of the respective processing station (84), such that the support surface of the respective movement device passes through the support surface of the respective processing station (84), and/or the support surface of the respective movement device and the support surface of the respective processing station (84) mesh with one another.

* * * * *